United States Patent
Lee et al.

(10) Patent No.: US 12,374,346 B2
(45) Date of Patent: Jul. 29, 2025

(54) ELECTRONIC DEVICE FOR PERFORMING AUDIO STREAMING AND OPERATING METHOD THEREOF

(71) Applicant: SAMSUNG ELECTRONICS CO., LTD., Suwon-si (KR)

(72) Inventors: Sanghoon Lee, Suwon-si (KR); Hangil Moon, Suwon-si (KR); Hyunwook Kim, Suwon-si (KR); Jaeha Park, Suwon-si (KR); Kyungho Bang, Suwon-si (KR); Hyunchul Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 18/082,296

(22) Filed: Dec. 15, 2022

(65) Prior Publication Data

US 2023/0154478 A1    May 18, 2023

Related U.S. Application Data

(63) Continuation of application No. PCT/KR2022/017297, filed on Nov. 7, 2022.

(30) Foreign Application Priority Data

Nov. 17, 2021 (KR) .......... 10-2021-0158772
Dec. 21, 2021 (KR) .......... 10-2021-0183753

(51) Int. Cl.
*G10L 19/24* (2013.01)
*G10L 19/00* (2013.01)
*H04L 65/75* (2022.01)

(52) U.S. Cl.
CPC .......... *G10L 19/24* (2013.01); *G10L 19/0017* (2013.01); *H04L 65/75* (2022.05)

(58) Field of Classification Search
CPC .............. G10L 19/24; G10L 19/00
See application file for complete search history.

(56) References Cited

U.S. PATENT DOCUMENTS 9,609,382 B2   3/2017  Kwon et al.
9,984,692 B2   5/2018  Fejzo
(Continued)

FOREIGN PATENT DOCUMENTS

KR   10-2016-0004712 A   1/2016
KR   10-2018-0051284 A   5/2018
(Continued)

OTHER PUBLICATIONS

Liebchen, Tilman. "An introduction to MPEG-4 audio lossless coding." 2004 IEEE International conference on acoustics, speech, and signal processing. vol. 3. IEEE, 2004. (Year: 2004).*
(Continued)

*Primary Examiner* — Jialong He
(74) *Attorney, Agent, or Firm* — Sughrue Mion, PLLC

(57) ABSTRACT

An electronic device includes a memory configured to store computer-executable instructions; and a processor configured to execute the computer-executable instructions to: based on a result of analyzing a transmission environment of a wireless communication channel through which an audio signal is transmitted, determine a bitrate of the audio signal, encode the audio signal into packets according to the bitrate, the packets including a main packet for audio streaming and a plurality of extension packets for sound quality improvement, based on at least one of a type of the packets and the result of analyzing the transmission environment, determine a packet type indicating a modulation scheme and number of time slots used for transmitting each packet of the packets, and configure and transmit audio packets reflecting the packet type for each packet of the packets.

18 Claims, 18 Drawing Sheets

(56) References Cited

U.S. PATENT DOCUMENTS

| | | | |
|---|---|---|---|
| 10,686,859 | B2 | 6/2020 | Srikantam et al. |
| 2011/0106546 | A1 | 5/2011 | Fejzo |
| 2014/0032227 | A1 | 1/2014 | Zopf et al. |
| 2015/0327001 | A1 | 11/2015 | Kirshenberg et al. |
| 2018/0115864 | A1* | 4/2018 | Ryu .................. H04W 4/80 |
| 2020/0004496 | A1 | 1/2020 | Park et al. |
| 2020/0075032 | A1* | 3/2020 | Joseph ................ G10L 19/24 |
| 2020/0267200 | A1* | 8/2020 | Baek .................. H04M 7/0081 |

FOREIGN PATENT DOCUMENTS

| | | |
|---|---|---|
| KR | 10-2018-0062230 A | 6/2018 |
| KR | 10-2020-0100387 A | 8/2020 |
| KR | 10-2021-0080897 A | 7/2021 |
| WO | 2021/052293 A1 | 3/2021 |

OTHER PUBLICATIONS

Jing, Li, Chen Wanzhong, and Zhao Xiaohui. "Achievement of Bluetooth adaptive packet selection strategies based on SNR estimation." The Journal of China Universities of Posts and Telecommunications 23.1 (2016): 8-48. (Year: 2016).*

Yang, Dai, et al. "High-fidelity multichannel audio coding with Karhunen-Loeve transform." IEEE Transactions on Speech and Audio Processing 11.4 (2003): 365-380. (Year: 2003).*

Communication dated Sep. 30, 2024, issued by the European Patent Office in European Application No. 22895933.4.

Gary Spittle, "The Applications and Challenges of Processing Audio Over Bluetooth," Music Everywhere—23rd AES Conference in UK, Apr. 9, 2008, total 10 pages, XP093203804.

International Search Report (PCT/ISA/210), dated Feb. 14, 2023, issued by the International Searching Authority for International Application No. PCT/KR2022/017297.

* cited by examiner

|  | Output size (9msec) | Payload size (18msec) |
|---|---|---|
| 256kbps | 292byte (2-DH3) | 584byte (2-DH5) |
| 328kbps | 372byte (2-DH5) | 744byte (3-DH5) |

ELECTRONIC DEVICE FOR PERFORMING AUDIO STREAMING AND OPERATING METHOD THEREOF

CROSS-REFERENCE TO RELATED APPLICATIONS

This application is a continuation application of International Application No. PCT/KR2022/017297, filed on Nov. 7, 2022, which claims priority to Korean Patent Application No. 10-2021-0158772, filed on Nov. 17, 2021, in the Korean Intellectual Property Office, and Korean Patent Application No. 10-2021-0183753, filed on Dec. 21, 2021, in the Korean Intellectual Property Office, the disclosures of which are incorporated by reference herein in their entireties.

BACKGROUND

1. Field

The disclosure relates to audio streaming, and more particularly, to an electronic device for performing audio streaming and an operating method thereof.

2. Description of Related Art

With the development of wireless communication technology, various types of wearable devices are being used with smartphones. For example, headsets used when a user listens to music or makes a call are rapidly changing from a wired connection scheme to a wireless connection scheme such as Bluetooth. In particular, a True-Wireless Stereo (TWS) type wireless headset in which the left and right sides are separated has become popular, and accordingly market expectations for TWS audio quality are rising. Accordingly, major domestic and foreign music streaming service companies are enhancing High Fidelity (HiFi) audio services such as high-quality lossless sound sources.

To transmit high-quality audio data using wireless transmission technology such as Bluetooth, a large amount of data must be transmitted wirelessly. Due to the characteristics of a wireless headset, sound interruption may occur in a weak electric field environment which has poor transmission, and the wireless headset may become vulnerable to sound interruption as the size of transmitted data increases. For example, in the case of a TWS type wireless headset in which the left and right sides are separated, such sound interruption may occur more frequently.

SUMMARY

According to an aspect of the disclosure, an electronic device includes: a memory configured to store computer-executable instructions; and a processor configured to execute the computer-executable instructions to: based on a result of analyzing a transmission environment of a wireless communication channel through which an audio signal is transmitted, determine a bitrate of the audio signal, encode the audio signal into packets according to the bitrate, the packets including a main packet for audio streaming and a plurality of extension packets for sound quality improvement, based on at least one of a type of the packets and the result of analyzing the transmission environment, determine a packet type indicating a modulation scheme and number of time slots used for transmitting each packet of the packets, and configure and transmit audio packets reflecting the packet type for each packet of the packets.

The processor may be further configured to execute the computer-executable instructions to analyze the transmission environment based on levels of the transmission environment using at least one of information on remaining space of a transmission buffer of the electronic device that transmits the audio packets in predetermined period units, a received signal strength indicator (RSSI) measured by the electronic device, a number of Bluetooth devices connected to the electronic device, and a use state value of Wireless-Fidelity (Wi-Fi) used by the electronic device.

The processor may be further configured to execute the computer-executable instructions to determine the bitrate of the audio signal based on levels of the transmission environment.

The processor may be further configured to execute the computer-executable instructions to: divide the audio signal into a main audio signal and a residual audio signal, encode the main audio signal into the main packet, and encode the residual audio signal into the plurality of extension packets.

The processor may be further configured to execute the computer-executable instructions to: encode the audio signal using lossy compression to generate an encoded audio signal, configure the encoded audio signal as the main packet, losslessly encode a residual signal corresponding to a difference between the audio signal and the encoded audio signal, and divide the losslessly encoded residual signal into the plurality of extension packets.

The processor may be further configured to execute the computer-executable instructions to: classify the losslessly encoded residual signal into a plurality of regions from a most significant bit (MSB) to a least significant bit (LSB), and divide the losslessly encoded residual signal into the plurality of extension packets according to an importance of the plurality of regions.

The processor may be further configured to execute the computer-executable instructions to sequentially divide, in a bit plane on which the losslessly encoded residual signal is encoded, a region corresponding to the MSB to a region corresponding to the LSB into a first extension packet having highest importance to a fourth extension packet having lowest importance.

The processor may be further configured to execute the computer-executable instructions to: classify a frequency band of the residual signal into a plurality of bands, and divide the frequency band of the residual signal into the plurality of extension packets according to importance of data positioned in the plurality of bands.

The processor may be further configured to execute the computer-executable instructions to sequentially divide data positioned in a low frequency band including a lowest frequency to data positioned in a high frequency band including a highest frequency, from among the plurality of bands, into a first extension packet having a highest importance to a fourth extension packet having a lowest importance.

The processor may be further configured to execute the computer-executable instructions to, based on the type of the packet being the main packet, determine a first packet type for stable transmission of the main packet.

The processor may be further configured to execute the computer-executable instructions to, based on the type of the packet being an extension packet, determine the packet type of each extension packet of the plurality of extension packets based on at least one of a level of the transmission environment and an importance of the extension packet.

The processor may be further configured to execute the computer-executable instructions to: divide the packets, and determine, for each packet of the packets, the packet type further based on a data amount of the audio signal.

According to an aspect of the disclosure, an operating method of an electronic device, includes: analyzing a transmission environment of a wireless communication channel through which an audio signal is transmitted; based on a result of the analyzing of the transmission environment, determining a bitrate of the audio signal; encoding the audio signal into packets according to the bitrate, the packets including a main packet for audio streaming and a plurality of extension packets for sound quality improvement; determining, for each packet of the packets, based on at least one of the type of the packets and the result of analyzing the transmission environment, determining a packet type indicating a modulation scheme and number of time slots used for transmitting for each packet of the packets; configuring audio packets reflecting the packet type for each packet of the packets; and transmitting the audio packets.

The analyzing the transmission environment may include analyzing the transmission environment based on levels of the transmission environment using at least one of information on a remaining space of a transmission buffer of the electronic device that transmits the audio packets in predetermined period units, a received signal strength indicator (RSSI) measured by the electronic device, number of Bluetooth devices connected to the electronic device, and a use state value of Wireless-Fidelity (Wi-Fi) used by the electronic device, and the determining the bitrate of the audio signal includes determining the bitrate of the audio signal based on the levels of the transmission environment.

The encoding may include: dividing the audio signal into a main audio signal and a residual audio signal; encoding the main audio signal into the main packet; and encoding the residual audio signal into the plurality of extension packets.

The encoding may include: encoding the audio signal using lossy compression to generate an encoded audio signal; configuring the encoded audio signal as the main packet; losslessly encoding a residual signal corresponding to a difference between the audio signal and the encoded audio signal; and dividing the losslessly encoded residual signal into the plurality of extension packets.

The dividing the losslessly encoded residual signal into the plurality of extension packets may include: classifying the losslessly encoded residual signal into a plurality of regions from a most significant bit (MSB) to a least significant bit (LSB), and dividing the losslessly encoded residual signal into the plurality of extension packets according to importance of the plurality of regions; and classifying a frequency band of the residual signal into a plurality of bands, and dividing the frequency band of the residual signal into the plurality of extension packets according to importance of data positioned in the plurality of bands.

The determining the packet type may include at least one of: based on the type of a packet being the main packet, determining a first packet type for stable transmission of the main packet; and based on the type of the packet being an extension packet, determining the packet type of each extension packet of the plurality of extension packets based on at least one of a level of the transmission environment and an importance of that extension packet.

The determining the packet type may include: dividing the packets; and determining, for each packet of the packets, the packet type further based on a data amount of the audio signal.

According to an aspect of the disclosure non-transitory computer-readable storage medium storing instructions that, when executed by a processor, cause the processor to perform the operating method.

In addition, various effects directly or indirectly ascertained through the disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
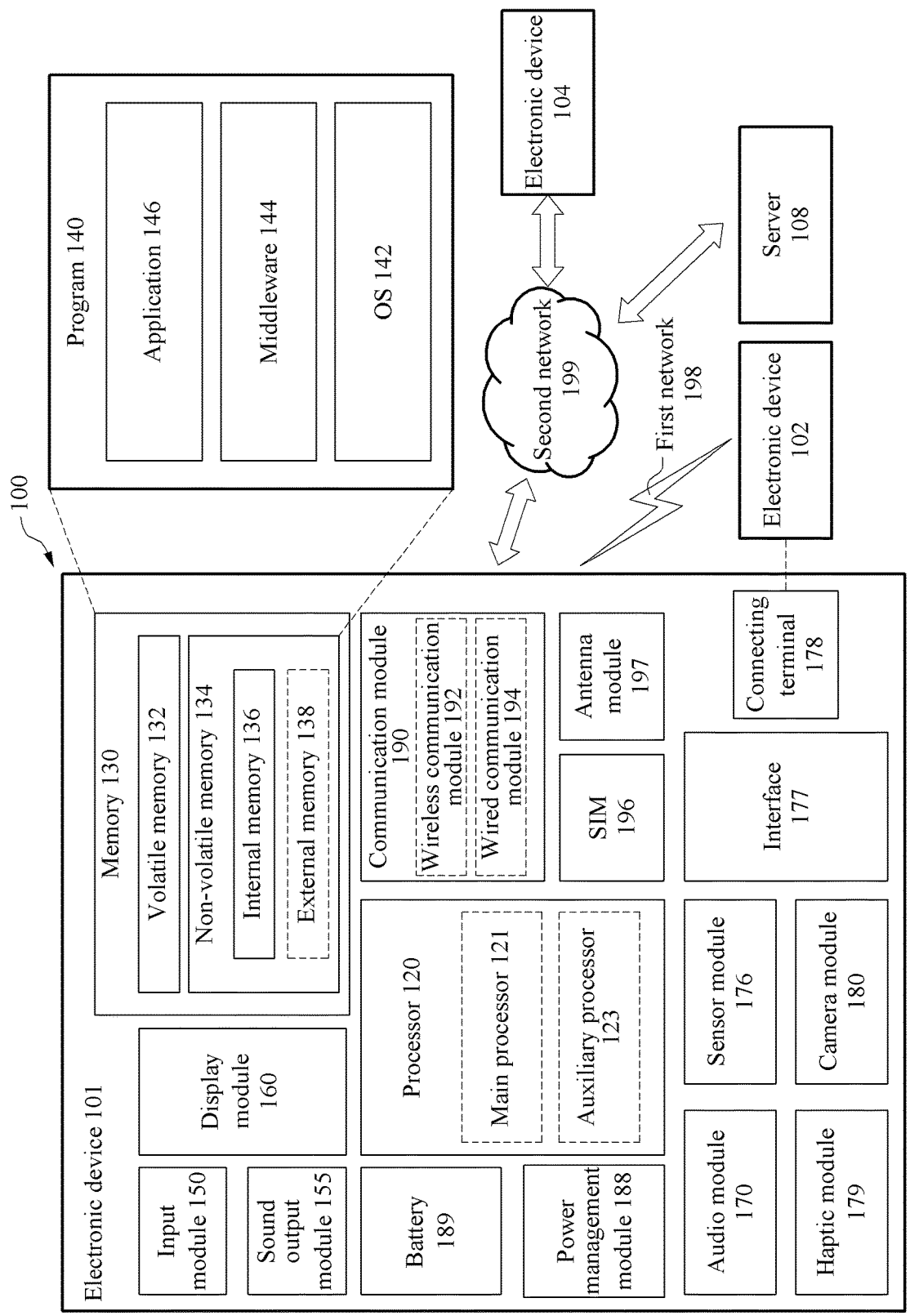
FIG. 1 is a block diagram illustrating an electronic device in a network environment, according to embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence (AI) model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an embodiment, the display module 160 may include a touch sensor adapted to sense a touch, or a pressure sensor adapted to measure the intensity of force of the touch.

The audio module 170 may convert sound into an electrical signal or vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve a high data transmission rate, for example. The wireless communication module 192 may support various technologies for securing performance on a high-frequency band, such as, beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices (e.g., the electronic device 102 or 104) may be a device of the same type as or a different type from the electronic device 101. According to an embodiment, all or some of operations to be executed by the electronic device 101 may be executed by one or more external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least portion of the function or service. The one or more external electronic devices receiving the request may perform the at least part of the function or service, or an additional function or an additional service related to the request, and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device (e.g., the electronic device 104) may include an Internet-of-things (IoT) device. The server 108 may be an intelligent server using machine learning and/or a neural network. According to an embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
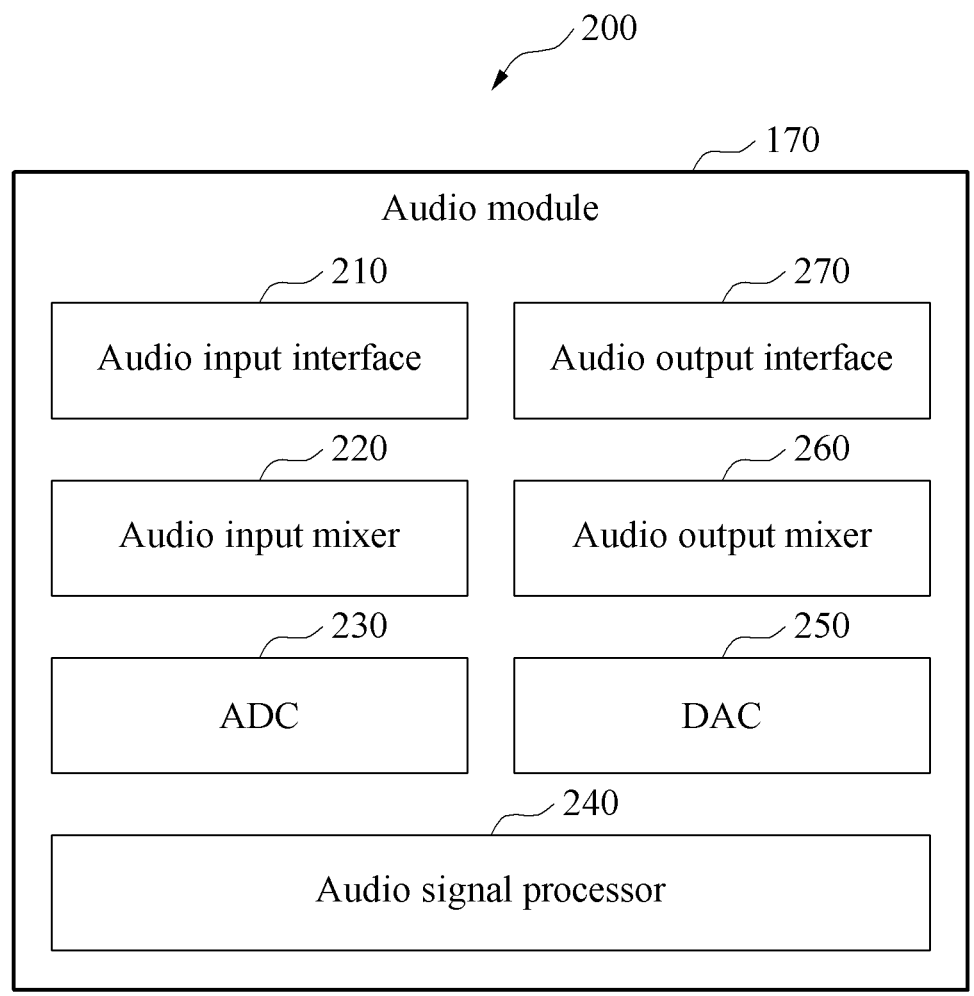
FIG. 2 is a block diagram of an audio module according to an embodiment.

FIG. 2 is a block diagram 200 of an audio module 170 according to an embodiment. The audio module 170 of FIG. 2 may include or may be similar in many respects to the audio module 170 described above with reference to FIG. 1 and may include additional features not mentioned above.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more function of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, and/or a receiver. According to an embodiment, the sound output module 155 may include a plurality of speakers. In this case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

The electronic device according to embodiments of the disclosure may be one of various types of electronic devices (e.g., electronic device 101 of FIG. 1). The electronic device may include, for example, a portable communication device (e.g., a smartphone), a computer device, a portable multimedia device, a portable medical device, a camera, a wearable device, or a home appliance device. According to embodiments of the disclosure, the electronic device is not limited to those described above.

It should be understood that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one or two of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more function. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same manner or in a similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
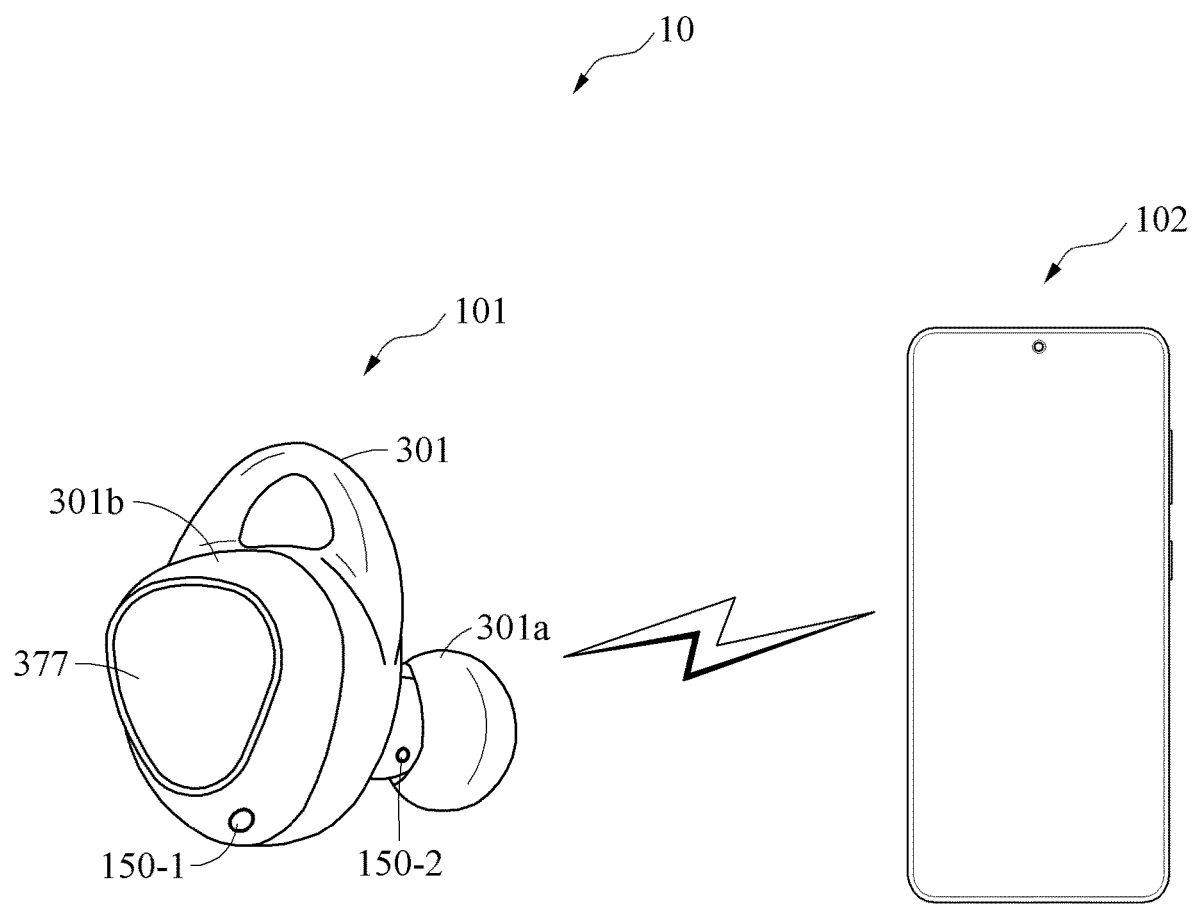
FIG. 3 is a diagram illustrating an example audio signal processing system according to an embodiment.

FIG. 3 is a diagram illustrating an example audio signal processing system 10 according to an embodiment.

Referring to FIG. 3, according to an embodiment, the audio signal processing system 10 may include a first electronic device 101 and a second electronic device 102. The first electronic device 101 and the second electronic device 102 may include at least some of the configurations of the electronic device 101 described above with reference to FIG. 1. According to an embodiment, the first electronic device 101 may be connected to the second electronic device 102 by wire or wirelessly, and may output an audio signal transmitted by the second electronic device 102. The first electronic device 101 may collect an external sound signal using a plurality of microphones and transmit the collected audio signal to the second electronic device 102.

According to an embodiment, the first electronic device 101 may be a wireless earphone capable of establishing a short-range communication channel (e.g., a Bluetooth module-based communication channel) with the second electronic device 102. For example, the first electronic device 101 may be any one of a true-wireless stereo (TWS), wireless headphones, and a wireless headset. The first electronic device 101 is illustrated as a kernel-type wireless earphone in FIG. 3, but is not limited thereto. For example, the first electronic device 101 may be a stem-type wireless earphone in which at least a part of the housing protrudes in a predetermined direction to collect a user voice signal. According to an embodiment, the first electronic device 101 may be a wired earphone connected to the second electronic device 102 in a wired manner.

According to an embodiment, the first electronic device 101, which is an earphone-type device, may include a housing 301 (or a case) including an insertion portion 301a that may be inserted into a user's ear, and a mounting portion 301b connected to the insertion portion 301a capable of being mounted at least partially on the user's auricle. The first electronic device 101 may include a plurality of microphones (e.g., first microphone 150-1 and second microphone 150-2).

According to an embodiment, the electronic device 101 may include an input interface 377 capable of receiving an input of the user. The input interface 377 may include, for example, a physical interface (e.g., a physical button or a touch button) and a virtual interface (e.g., a gesture, object recognition, or voice recognition). According to an embodiment, the electronic device 101 may include a touch sensor capable of detecting a contact with the user's skin. For example, an area (e.g., the input interface 377) in which the touch sensor is disposed may be located in a part of the electronic device 101. The user may apply an input by touching the area using a body part. The touch input may include, for example, a single touch, multiple touches, a swipe, and/or a flick.

The microphones 150-1 and 150-2 may perform the function of the input module 150 described above with reference to FIG. 1, and any repeated description related thereto has been omitted. Among the microphones 150-1 and 150-2, the first microphone 150-1 may be disposed on the mounting portion 301b such that, based on the inside of the ear, at least a portion of the sound hole may be exposed to the outside, to collect external ambient sound while the first electronic device 101 is worn on the user's ear. Among the microphones 150-1 and 150-2, the second microphone 150-2 may be disposed on the insertion portion 301a. The second microphone 150-2 may be disposed such that, based on the auricle-side opening of the outer ear path, at least a portion of the sound hole is exposed toward the inside of the outer ear path or at least a portion of the sound hole is in contact with the inner wall of the outer ear path, to collect signals transmitted into the outer ear canal (or, external auditory canal) while the first electronic device 101 is worn on the user's ear. For example, when the user utters a voice while wearing the first electronic device 101, at least some of the tremor from the utterance may be transmitted through the user's body structure such as the skin, muscles, or bones, and the transmitted tremor may be collected as ambient sound by the second microphone 150-2 inside the ear.

According to an embodiment, the second microphone 150-2 may be any of various types of microphones (e.g., an in-ear microphone, an inner microphone, or a bone conduction microphone) capable of collecting sound from the cavity inside the user's ear. For example, the second microphone 150-2 may include at least one air conduction microphone and/or at least one bone conduction microphone for detecting a voice. The air conduction microphone may detect a voice (e.g., an utterance of a user) transmitted through air and output a voice signal corresponding to the detected voice. The bone conduction microphone may measure a vibration of a bone (e.g., the skull) caused by a vocalization of a user and output a voice signal corresponding to the measured vibration. The bone conduction microphone may be referred to as a bone conduction sensor, or various other names. A voice detected by the air conduction microphone may be a voice mixed with external noise, the mixing occurring while the user's utterance is being transmitted through air. Since the voice detected by the bone conduction microphone is from the vibration of a bone, it may include less external noise (e.g., influence of noise).

In FIG. 3, the first microphone 150-1 and the second microphone 150-2 are respectively illustrated as being installed on the electronic device 101, one of each, but the number is not limited thereto. A plurality of the first microphone 150-1, which is an external microphone, and/or a plurality of the second microphone 150-2, which is an in-ear microphone, may be installed on the electronic device 101. Although omitted in FIG. 3, the electronic device 101 may further include an accelerator for voice activity detection (VAD) and/or a vibration sensor (e.g., a voice pickup unit (VPU) sensor).

According to an embodiment, the first electronic device 101 may include the audio module 170 described above with reference to FIGS. 1 and 2. Any repeated description related thereto has been omitted. The first electronic device 101 may perform audio signal processing such as noise processing (e.g., noise suppressing), frequency band adjustment, and gain adjustment through the audio module 170 (e.g., through the audio signal processor 240 of FIG. 2). The configuration of the first electronic device 101 is further described with reference to FIG. 5. The first electronic device 101 may be referred to as the electronic device 101 in the descriptions relating to FIGS. 4 to 11.

According to an embodiment, the electronic device 101 may include a sensor capable of detecting if the electronic device 101 is worn on the user's ear. For example, the sensor may include a sensor (e.g., an infrared sensor or a laser sensor) capable of detecting a distance to an object, and a sensor (e.g., a touch sensor) capable of detecting a contact with the object. As the electronic device 101 is worn on the user's ear, the sensor may generate a signal by detecting a distance to the skin or a contact with the skin. The processor 120 of the electronic device 101 may recognize whether the electronic device 101 is currently worn by detecting the signal generated by the sensor.

According to an embodiment, the second electronic device 102 may establish a communication channel with the first electronic device 101, transmit a designated audio signal to the first electronic device 101, and/or receive an audio signal from the first electronic device 101. For example, the second electronic device 102 may be any of various electronic devices such as, but not limited to, a mobile terminal, a terminal device, a smartphone, a tablet personal computer (PC), a pad, or a wearable electronic device capable of forming a communication channel (e.g., a wired or wireless communication channel) with the first electronic device 101. The second electronic device 102 may include a configuration that is the same as or similar to the configuration of the electronic device 101 described above with reference to FIG. 1, and may include fewer or more configurations than the electronic device 101 of FIG. 1 depending on the implementation.

According to an embodiment, in the audio signal processing system 10, the first electronic device 101 may perform beamforming to obtain an improved user voice signal. For example, the first electronic device 101 may perform beamforming on an external sound signal received through the plurality of microphones 150-1 and 150-2.

Figure 4:
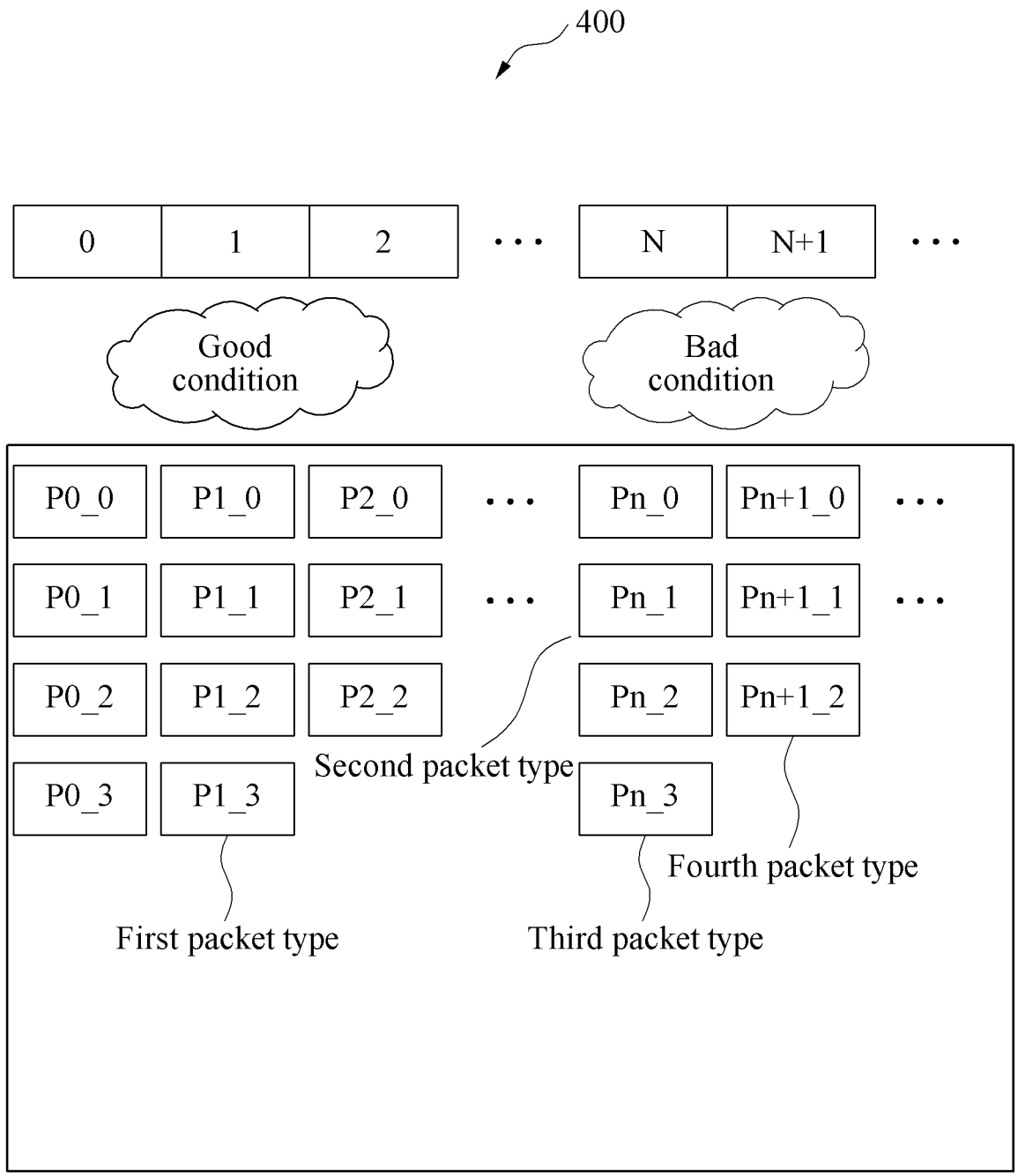
FIG. 4 is a diagram schematically illustrating a packet transmission method in a high-capacity audio streaming environment according to an embodiment.

FIG. 4 is a diagram schematically illustrating a packet transmission method in an audio streaming environment according to an embodiment. Referring to FIG. 4, a diagram 400 illustrating packet types transmitted in a case where a transmission environment is good ('Good condition', e.g., a performance metric of the transmission environment exceeds a predetermined threshold) and a case where a transmission environment is bad ('Bad condition', e.g., the performance metric of the transmission environment is inferior to the predetermined threshold) in a high-capacity audio streaming environment according to an embodiment is shown. According to an embodiment, operations of the electronic device (e.g., the electronic device 101 of FIGS. 1 and 3) described below may be performed by a Bluetooth chip included in a communication module (e.g., the communication module 190 of FIG. 1) of the electronic device 101 or may be performed by a processor (e.g., the processor 120 of FIG. 1) of the electronic device 101. Since the Bluetooth network is a wireless technology using a 2.4 GHz band, communication quality may be affected by other communication technologies using the same frequency band such as, but not limited to, Wi-Fi, Zigbee, or Long-Term Evolution (LTE) Band 7. The Bluetooth network may include, for example, a Bluetooth legacy network and/or a Bluetooth low energy (BLE) network. According to an embodiment, the electronic device 101 and the external electronic device (e.g., the electronic device 102 of FIGS. 1 and 3) may perform wireless communication through one of a Bluetooth legacy network and/or a BLE network, or perform wireless communication through two networks.

Due to the wireless transmission characteristics of Bluetooth audio, sound interruption may occur in a weak electric field in a poor transmission environment. For example, the bitrate generally used in sub-band coder-decoder (SBC), which is a standard Bluetooth coder-decoder (codec), may be 229 kbps, and the average bitrate used in free lossless audio codec (FLAC), which is a standard lossless audio codec, may be 900 kbps, which is about 4 times higher. When a large amount of audio data such as Ultra-High Quality (UHQ) (e.g., 96 kHz/24 bit) audio or lossless audio is transmitted using Bluetooth wireless communication, sound interruption may occur depending on the wireless transmission environment.

In a related Bluetooth audio streaming service, since the data size of an encoded audio signal is small, one audio frame may be transmitted as one audio packet. However, in a case where a high-capacity audio signal is transmitted, such as lossless audio, it may be impossible to transmit one audio frame as one packet, and it may be necessary to divide the transmission into several packets. Accordingly, it may be difficult to ensure audio quality while reducing sound interruption in a weak electric field environment just by adjusting the bitrate and/or changing the packet type.

In an embodiment, when one audio frame is divided into a plurality of audio packets and transmitted, a bitrate may be set according to a result of analyzing the transmission environment (e.g., a congestion level, an electric field environment), and various packet types (e.g., a first packet type to a fourth packet type) for each packet may be set considering the type of the packet to be transmitted and/or the importance of each packet (e.g., extension packets) in addition to the analysis result of the transmission environment, to reduce sound interruption in a weak electric field environment and to improve audio quality.

Figure 5:
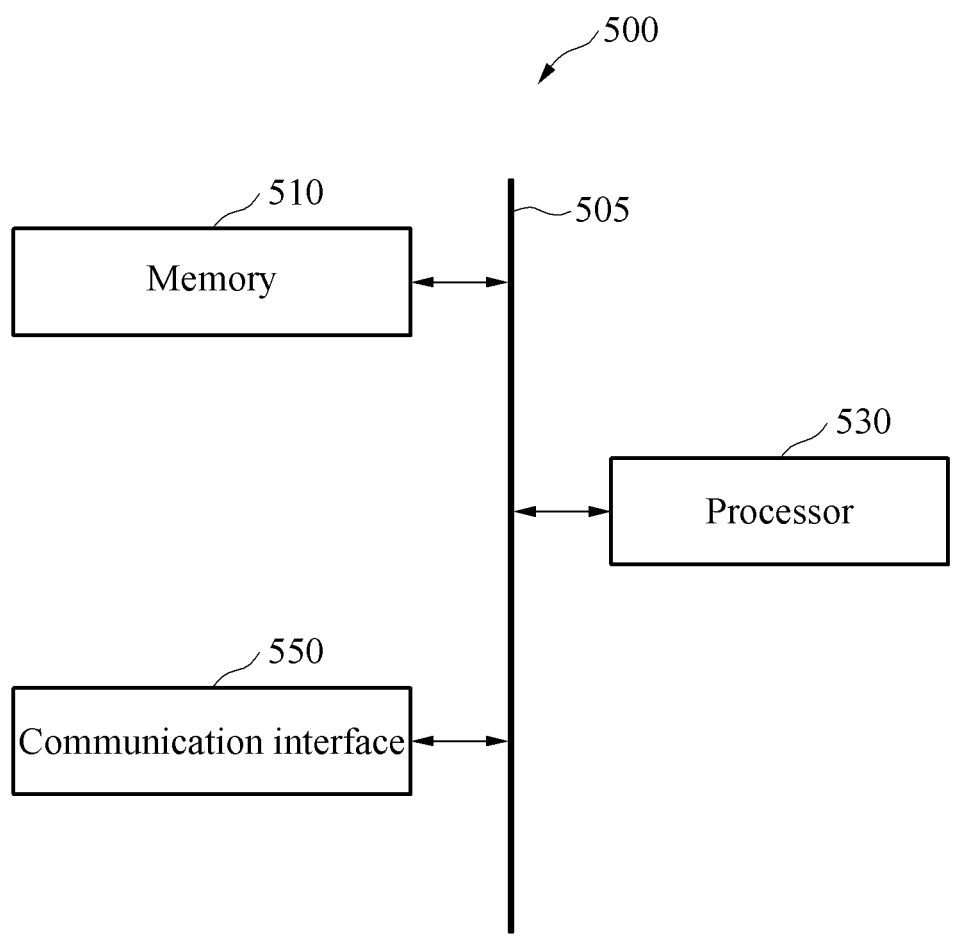
FIG. 5 is a block diagram of an electronic device according to an embodiment.

FIG. 5 is a block diagram of an electronic device according to an embodiment. Referring to FIG. 5, an electronic device 500 (e.g., the electronic device 101 of FIGS. 1 and 3) may include a memory 510 (e.g., the memory 130 of FIG. 1), a processor 530 (e.g., the processor 120 of FIG. 1), and a communication interface 550 (e.g., the communication module 190 of FIG. 1). The memory 510, the processor 530, and the communication interface 550 may communicate with each other via a communication bus 505.

The memory 510 may store computer-executable instructions. The memory 510 may store signals or data received through the communication interface 550 and/or an audio packet configured by the processor 530.

The memory 510 may store a variety of information generated in a processing process of the processor 530 described below. Alternatively or additionally, the memory 510 may store a variety of data and/or programs. The memory 510 may include, for example, a volatile memory (e.g., the volatile memory 132 of FIG. 1) or a non-volatile memory (e.g., the non-volatile memory 134 of FIG. 1). The memory 510 may include a high-capacity storage medium such as a hard disk to store a variety of data.

The processor 530 may execute instructions by accessing the memory 510. The processor 530 may determine a bitrate of an audio signal based on a result of analyzing a transmission environment of a wireless communication channel through which the audio signal is transmitted. The processor 530 may analyze the transmission environment based on levels of the transmission environment using at least one of information on a remaining space of a transmission buffer of the electronic device 500 that transmits the audio packets in predetermined period units, a received signal strength indicator (RSSI) measured by the electronic device 500, the number of Bluetooth devices connected to the electronic device 500, and a use state value of Wi-Fi used by the electronic device 500. Since both a Bluetooth signal and a Wi-Fi signal may be transmitted using the 1.4 GHz band, interference may occur when the electronic device 500 uses both signals together. The use state value of Wi-Fi may be a value indicating whether the electronic device 500 is using Wi-Fi, and for example, when the electronic device 500 is using Wi-Fi, which is an on state, the use state value may be set to 1, and when the electronic device 500 is not using Wi-Fi, which is an off state, the use state value may be set to 0. In other embodiments, the use state values associated with the on state and the off state may differ without deviating from the scope of the present disclosure.

For example, based on the levels of the transmission environment, the processor 530 may determine a bitrate of an audio signal by setting a high bitrate value when the wireless transmission environment indicated by the level of the transmission environment is good (e.g., a performance metric of the transmission environment exceeds a predetermined threshold), and a low bitrate value when the wireless transmission environment indicated by the level of the transmission environment is not good (e.g., the performance metric of the transmission environment is inferior to the predetermined threshold).

The processor 530 may encode the audio signal into packets including a main packet (e.g., a main packet 850 of FIG. 8) for audio streaming and a plurality of extension packets (e.g., extension packets 860 of FIG. 8) for sound quality improvement, according to the bitrate. When a high-capacity audio signal needs to be transmitted, such as lossless audio, the processor 530 may separate the audio signal into a main audio signal and a residual audio signal and encode the audio signal into a main packet and a plurality of extension packets.

The processor 530 may encode the audio signal by using lossy compression, and configure the encoded signal as the main packet. Alternatively or additionally, the processor 530 may losslessly encode a residual signal corresponding to a difference between the audio signal and a signal encoded by the lossy compression, and divide the losslessly encoded signal into the plurality of extension packets.

Figure 8:
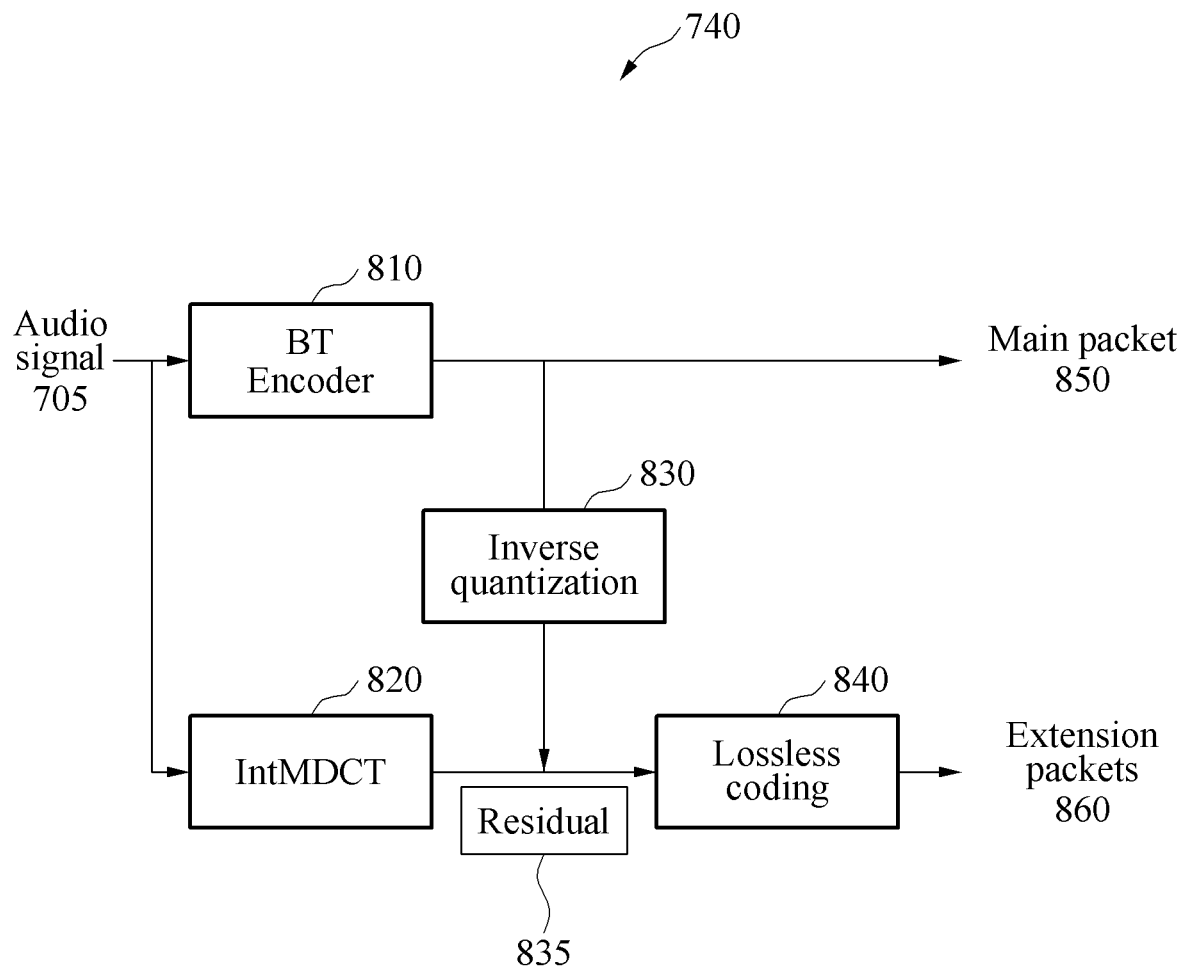
FIG. 8 is a diagram illustrating the configuration and operation of an audio encoder according to an embodiment.
Figure 9:
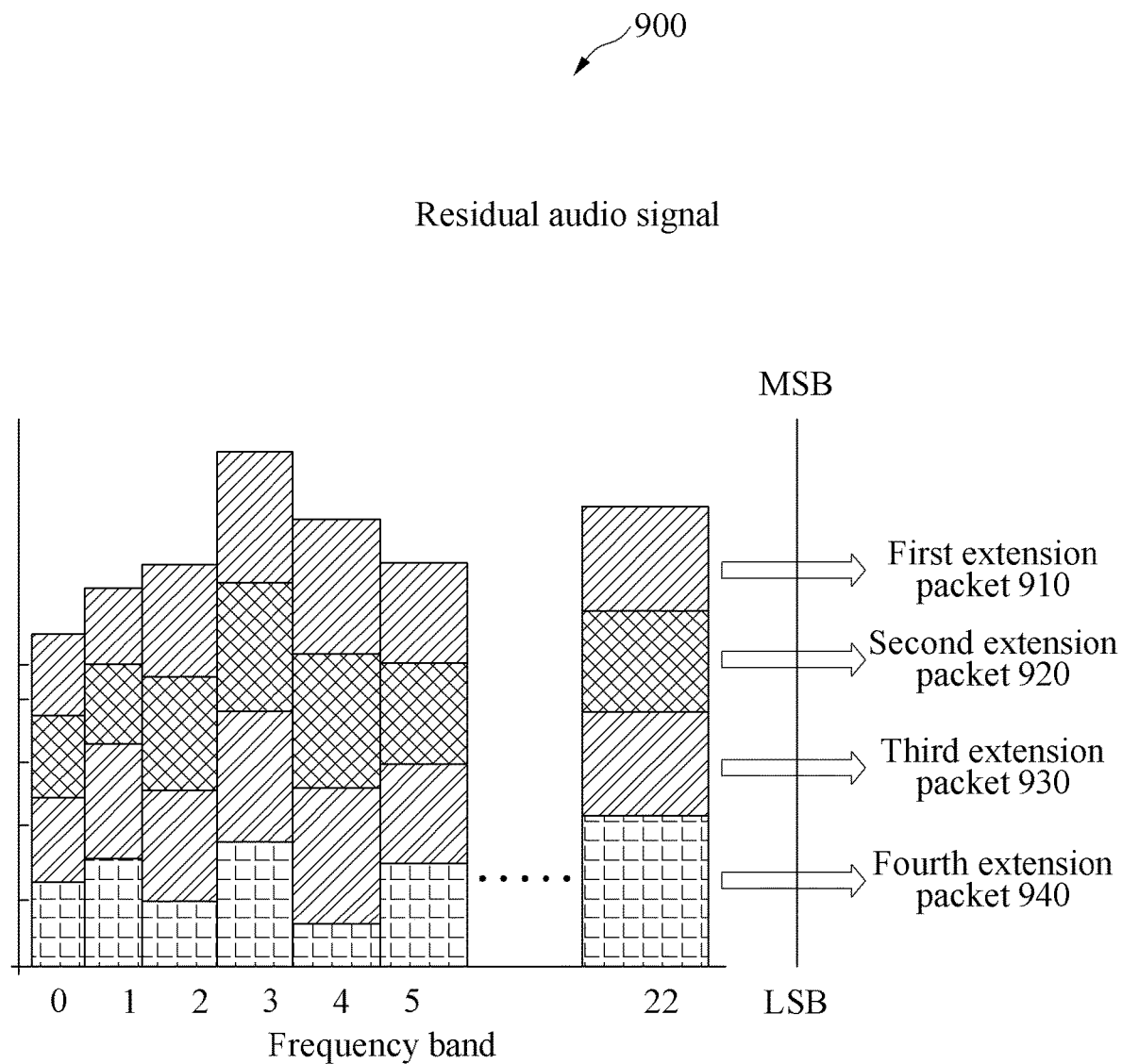
FIG. 9 is a diagram illustrating a method of configuring a residual signal as extension packets according to an embodiment.
Figure 10:
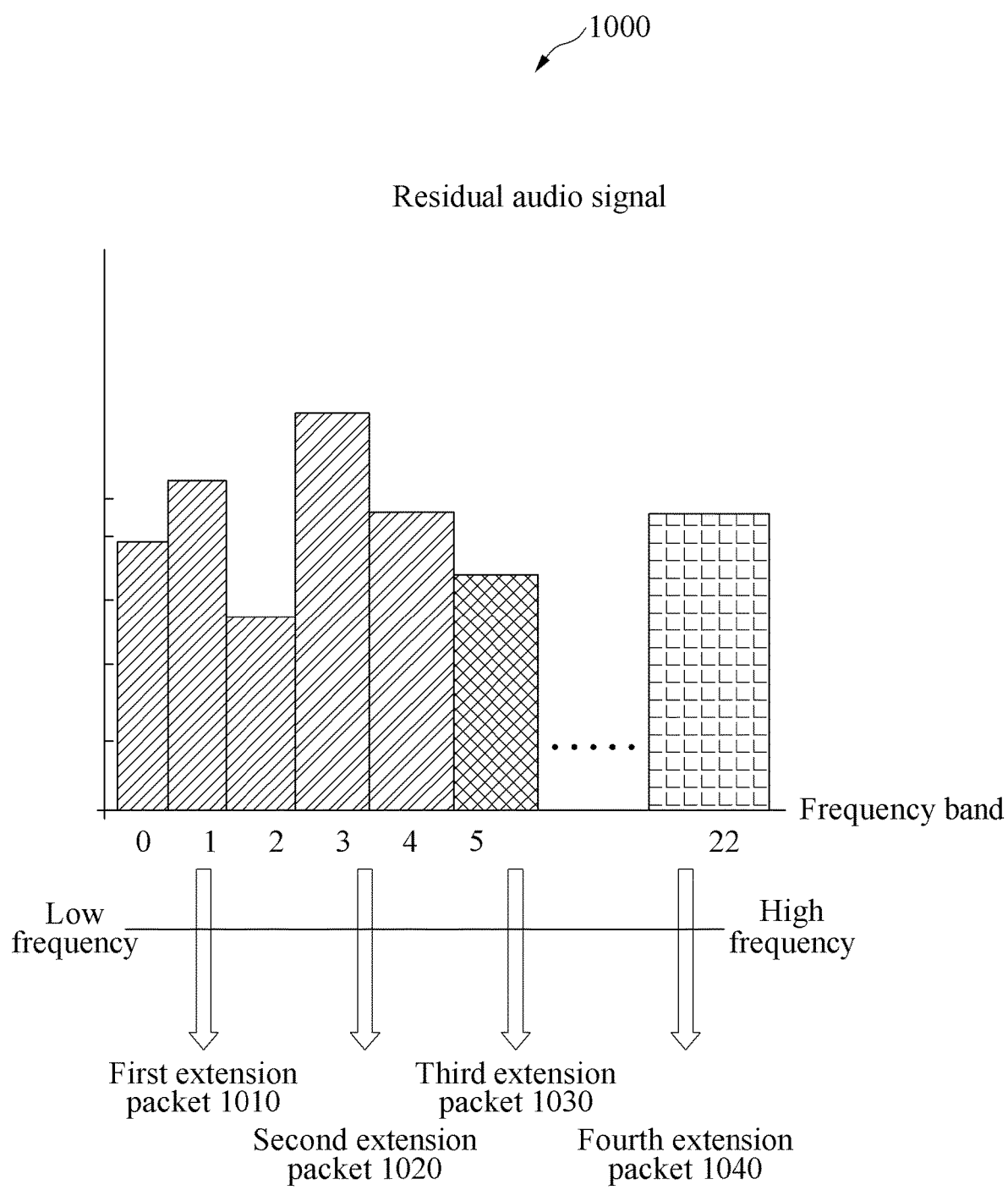
FIG. 10 is a diagram illustrating a method of configuring a residual signal as extension packets according to an embodiment.

A method of encoding an audio signal by dividing the audio signal into a main packet and extension packets, performed by the processor 530, is further described in with reference to FIGS. 8 to 10.

The processor 530 may be configured to determine a packet type indicating a modulation scheme and the number of time slots used for transmitting the corresponding packet for each packet, based on at least one of the analysis result of the transmission environment and the type of the packets. For example, when the type of the corresponding packet is the main packet, the processor 530 may be configured to determine a first packet type for stable transmission of the main packet regardless of the analysis result of the transmission environment. The first packet type may be, for example, a 2-DH1 packet or a 2-DH5 packet, but is not limited thereto. Alternatively or additionally, when the type of the corresponding packet is the extension packet, the processor 530 may be configured to determine the packet type of the extension packet to be any one of a first packet type to a fourth packet type, based on at least one of the level of the transmission environment and the importance of the extension packet. For example, the first packet type may be a 2-DH1 packet, the second packet type may be a 2-DH3 packet, the third packet type may be a 2-DH5 packet, and the fourth packet type may be a 3-DH5 packet, but packet types are not limited thereto. Packet types are further described with reference to FIG. 6A.

According to an embodiment, in the case of high-quality audio having a large transmission capacity, such as UHQ (e.g., 96 kHz/24 bit) and High-Fidelity (HiFi) (e.g., 48 kHz/24 bit) audio, the processor 530 may further consider the data amount of the audio signal in addition to the analysis result of the transmission environment to divide the packet and determine the packet type. A method of determining a packet type by further considering the data amount of the audio signal, performed by the processor 530, is further described with reference to FIG. 18.

The processor 530 may be configured to configure and transmit audio packets reflecting the packet type for each packet.

The processor 530 may execute a program and control the electronic device 500. Code of the program executed by the processor 530 may be stored in the memory 510.

Alternatively or additionally, the processor 530 may perform at least one of the methods described with reference to FIGS. 5 to 18 and/or a scheme corresponding to the at least one method. The electronic device 500 may be a hardware-implemented electronic device 500 having a circuit that is physically structured to execute desired operations of the processor 530. For example, the desired operations may include code or instructions included in a program. The hardware-implemented electronic device 500 may include, for example, a microprocessor, a CPU, a GPU, a processor core, a multi-core processor, a multiprocessor, an ASIC, a field-programmable gate array (FPGA), and/or an NPU.

Figure 6A:
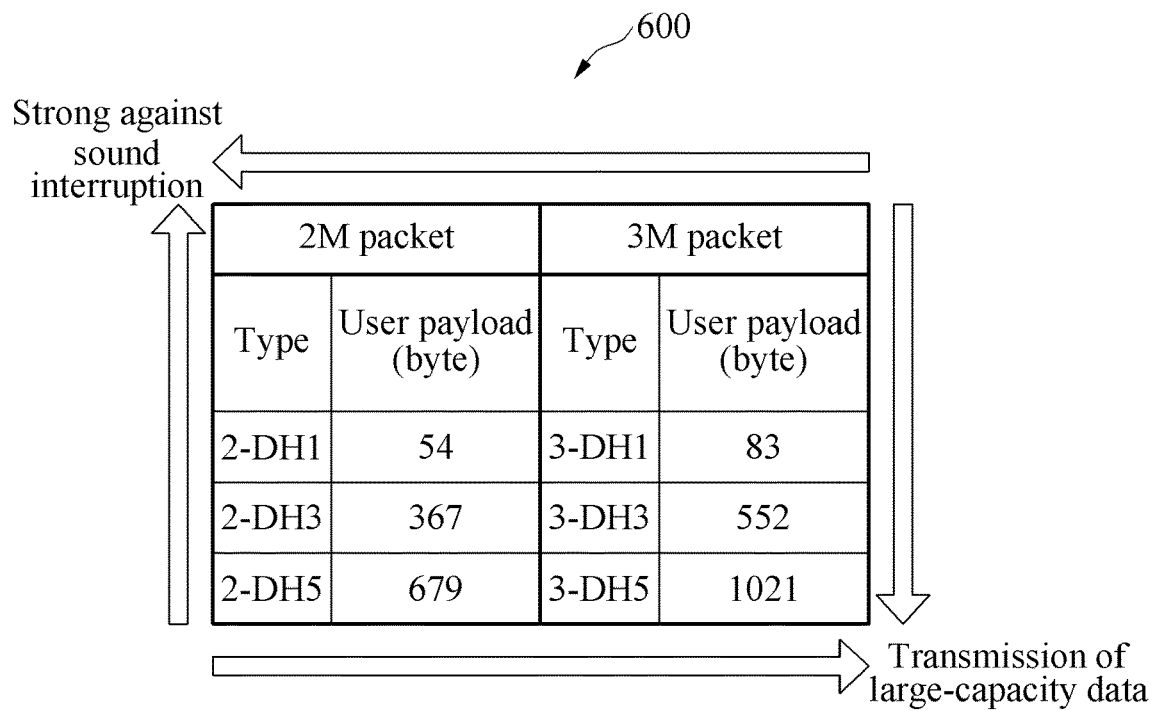
FIGS. 6A and 6B illustrate packet types and time slot usage for each packet type according to embodiments.
Figure 6B:
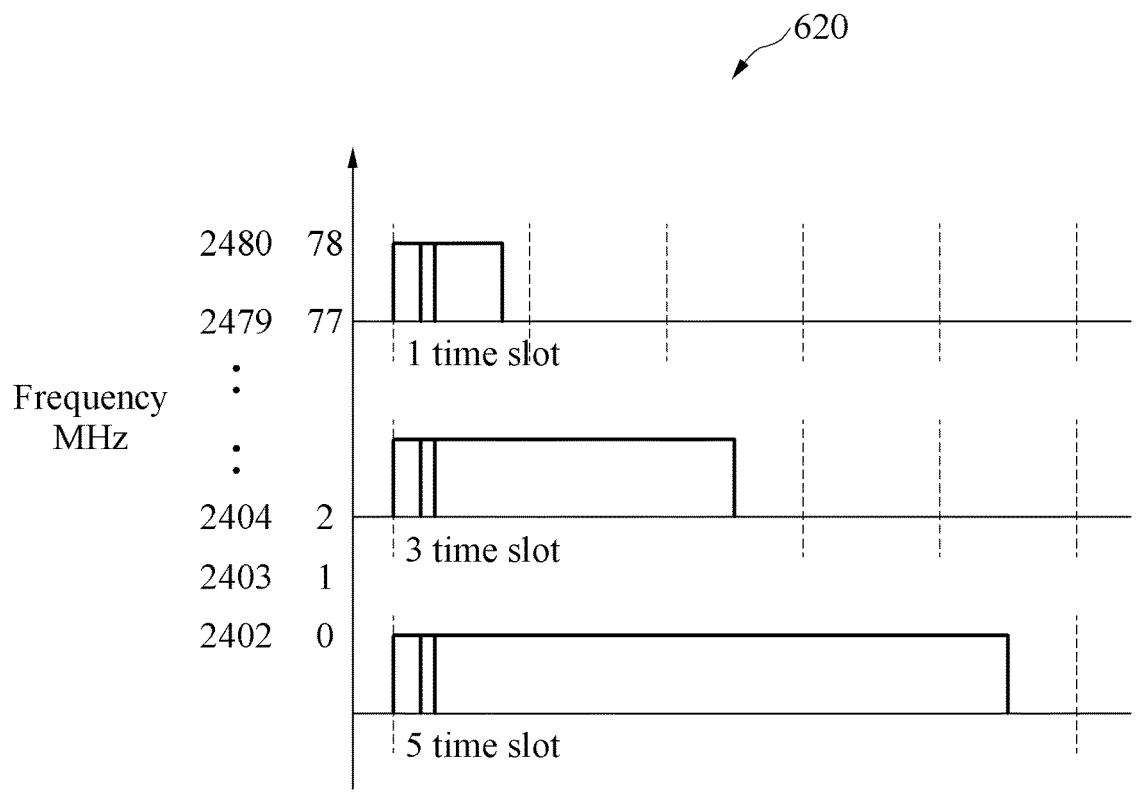

FIGS. 6A and 6B illustrate packet types and time slot usage for each packet type according to embodiments. Referring to FIG. 6A, a table 600 illustrating packet types of packets used in an advanced audio distribution profile (A2DP) according to an embodiment is shown. Here, the packet may be, for example, an asynchronous connection-less (ACL) packet, but is not limited thereto.

The Bluetooth standard defines various profiles for various uses, and for audio signal transmission, for example, a profile such as the A2DP may be used. In the case of the A2DP, an electronic device (e.g., the electronic device 101 of FIGS. 1 and 3 and/or the electronic device 500 of FIG. 5) may transmit an audio signal using, for example, an ACL packet as shown in table 600. The electronic device 500 may select an appropriate packet type of the ACL packet to be used according to the size of data and/or a bitrate of the audio signal to be transmitted for transmitting the audio signal. The ACL packet may be largely divided into a 2M packet or a 3M packet according to a modulation scheme of the packet. Since the 2M packet transmits less data than the 3M packet, the 2M packet may be stronger against sound interruption in a congested environment. Alternatively or additionally, since the 3M packet transmits a greater amount of data than the 2M packet, the 3M packet may be more advantageous for large-capacity data transmission. Packet types may be divided within the same 2M packet or 3M packet according to the number of time slots used for a packet transmission, as shown in FIG. 6B.

According to an embodiment, packet types may vary according to a modulation scheme and the 2-DH1 packet type, a 2-DH3 packet type, a 2-DH5 packet type, a 3-DH1 packet type, a D-DH3 packet type, and a D-DH5 packet type as shown in table 600, but are not limited thereto. In the packet types, the first 2 or 3 may indicate a 2M packet or 3M packet corresponding to the packet modulation scheme, and the number (e.g., 1, 3, 5) after the DH may indicate the number of time slots used by the packet. For example, the 2-DH3 packet type may refer to a 2M packet using 3 time slots, and the 3-DH5 packet type may refer to a 3M packet using 5 time slots.

Referring to FIG. 6B, a diagram 620 illustrating the time slot usage for each packet type is shown. One time slot may be, for example, 625 micro-seconds (μsec). The smaller the number of time slots used by a corresponding packet, the lower the probability may be of a transmission error occurring, and the more retransmission opportunities may be obtained in the same transmission period. Therefore, the smaller the number of time slots used by the packet, the stronger the packet may be against transmission errors.

Figure 7:
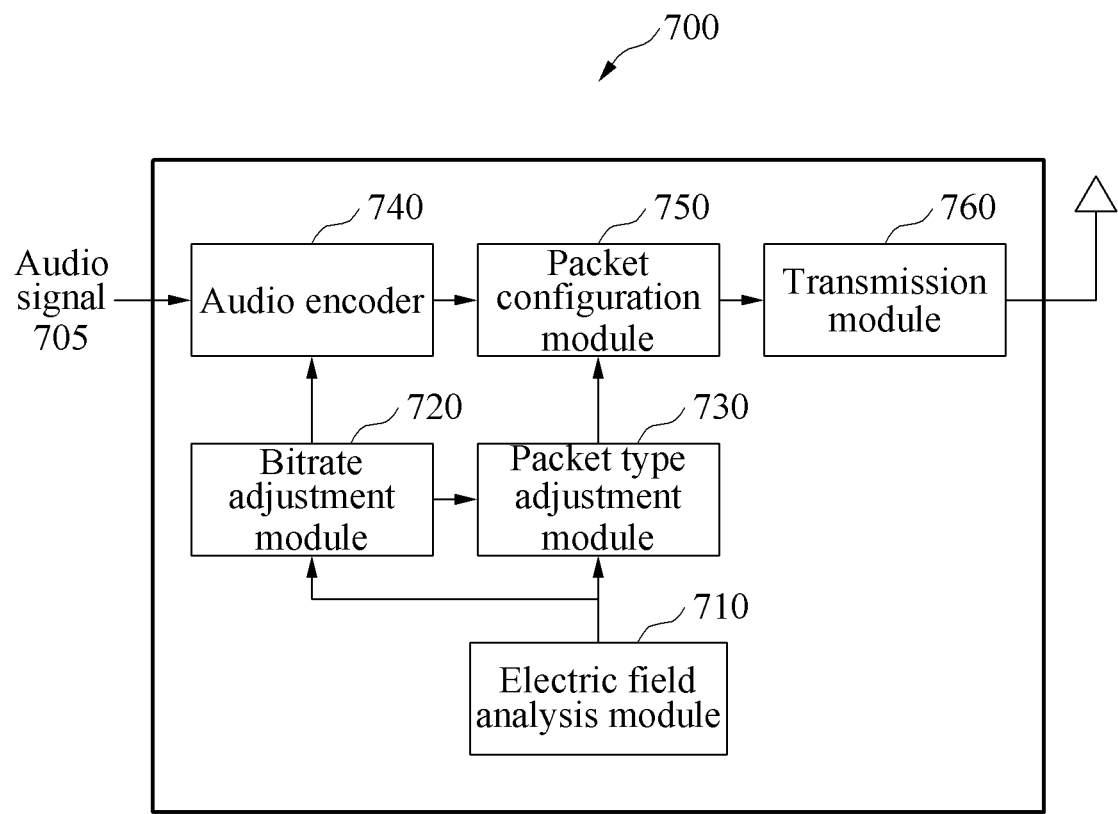
FIG. 7 is a block diagram of an electronic device according to an embodiment.

FIG. 7 is a block diagram of an electronic device according to an embodiment. Referring to FIG. 7, an electronic device 700 (e.g., the electronic device 101 of FIGS. 1 and 3 and/or the electronic device 500 of FIG. 5) may include an electric field analysis module 710, a bitrate adjustment module 720, a packet type adjustment module 730, an audio encoder 740, a packet configuration module 750, and a transmission module 760.

The electric field analysis module 710 may collect at least one of information on a remaining space of a transmission buffer of the electronic device 700 that transmits the audio packets in predetermined period units, an RSSI measured by the electronic device 700, the number of Bluetooth devices connected to the electronic device 700, and a use state value of Wi-Fi used by the electronic device 700. The electric field analysis module 710 may analyze the transmission environment using at least one of, or a combination of, the collected information, and may represent an analysis result as levels of the transmission environment.

The electric field analysis module 710 may analyze the transmission environment including electromagnetic field strength of the wireless communication channel. The electromagnetic field strength may indicate the strength of radio waves when the radio waves are transmitted, and may be expressed as energy per unit area. The electromagnetic field strength may be used as an example of an index (e.g., performance metric) indicating a "good" or "bad" transmission environment. That is, the electromagnetic field strength may be compared with a predetermined threshold to determine whether the transmission environment is "good" (e.g., the electromagnetic field strength exceeds the predetermined threshold) or "bad" (e.g., the electromagnetic field strength is inferior to the predetermined threshold). Hereinafter, the term 'electric field environment' may be understood to have the same meaning as 'transmission environment'.

The electric field analysis module 710 may continuously collect the state of a transmission buffer of the electronic device 700. Here, the 'state of the transmission buffer' may refer to a currently remaining space of the transmission buffer. The electric field analysis module 710 may determine a packet transmission environment between the electronic device 700 that transmits data and a device that receives data by using the state of the transmission buffer. For example, when the transmission environment is good, the level of the buffer indicating the remaining space of the transmission buffer may be maintained in a predetermined state. Alternatively or additionally, when the transmission environment is not good, the level of the transmission buffer may be increased due to data accumulated in the transmission buffer. For example, when the level of the transmission buffer is lower than a predetermined threshold, it may correspond to a state in which there is a comparatively small amount of buffered data due to smooth transmission (e.g., a state in which the transmission environment is good). Alternatively or additionally, when the level of the transmission buffer is higher than the predetermined threshold, it may correspond to a state in which there is a comparatively large amount of buffered data since transmission is not smooth (e.g., a state in which the transmission environment is bad).

The electric field analysis module 710 may analyze the level of the transmission environment, for example, from a level 1 (e.g., very good) to a level 5 (e.g., very bad), according to a degree to which the currently remaining space of the transmission buffer remains more than (e.g., above) a predetermined threshold or a degree to which the current remaining buffer space remains less than (e.g., below) the predetermined threshold. In some embodiments, the transmission environment may be categorized into a different number of levels (e.g., more levels, less levels) and/or the levels may be in increasing and/or decreasing order without deviating from the scope of the present disclosure.

Alternatively or additionally, the electric field analysis module 710 may additionally use the RSSI to measure the transmission environment. The RSSI may be an index indicating the strength of a received signal measured by each device. For example, the better the transmission environment is at a close distance, the higher the RSSI value may be, and the worse the transmission environment is when the devices are far away from each other, the lower the RSSI value may be. When the RSSI of a received signal measured by the electronic device 700 is higher than (e.g., exceeds) a predetermined threshold, the electric field analysis module 710 may analyze that the transmission environment is in a good state, and when the strength of the received signal is lower than or equal to (e.g., is inferior to) the predetermined threshold, the electric field analysis module 710 may analyze that the transmission environment is in a bad state.

The bitrate adjustment module 720 may adjust the bitrate to the current transmission environment according to the level of the transmission environment corresponding to a result of an analysis of the transmission environment by the electric field analysis module 710. For example, the better the transmission environment is (e.g., the closer the level of the transmission environment is to level 1), the bitrate adjustment module 720 may set (or adjust) the bitrate to a higher bitrate value. Alternatively or additionally, the worse the transmission environment is (e.g., the closer the level of the transmission environment is to level 5), the bitrate adjustment module 720 may set (or adjust) the bitrate to a lower bitrate value.

The bitrate adjustment module 720 may transmit the bitrate set according to the level of the transmission environment to the audio encoder 740.

The packet type adjustment module 730 may determine an appropriate packet type to use for transmission according to a result of analyzing the transmission environment analyzed by the electric field analysis module 710 and the type (e.g., a main packet (e.g., a main packet 850 of FIG. 8) or an extension packet (e.g., extension packets 860 of FIG. 8)) of the packets.

The packet type adjustment module 730 may determine the packet type according to, for example, the level of the transmission environment. For example, the packet type adjustment module 730 may select a 3M packet when the level of the transmission environment is closer to 1, and/or select a 2M packet as the level of the transmission environment is closer to 5. Alternatively or additionally, when there is a better transmission environment within the same 2M packet or 3M packet, the packet type adjustment module 730 may select a packet type that uses 5 time slots, and when the transmission environment is bad, the packet type adjustment module 730 may select a packet type that uses 3 time slots and/or a packet type that uses 1 time slot.

The packet type adjustment module 730 may determine, for example, a packet type according to the kind of packet. The main packet 850 may correspond to a packet having the highest priority that needs to be transmitted for seamless audio streaming. The extension packet 860 may be a packet including residual audio data and may correspond to a packet to be transmitted additionally to improve audio quality.

For example, when the type of the corresponding packet is the main packet 850, the packet type adjustment module 730 may select a packet type so that transmission may be stable regardless of a wireless transmission environment. For example, when the type of the corresponding packet is the main packet 850, the packet type adjustment module 730 may select the first packet type (e.g., a 2-DH1 packet type) that uses the smallest number of time slots in the 2M packet, for stable transmission of the main packet 850 regardless of the result of the analysis of the transmission environment.

When the type of the corresponding packet is the extension packet 860, the packet type adjustment module 730 may select a packet type of the extension packets 860 based on at least one of the level of the transmission environment and the importance of the extension packets 860. When a wireless transmission environment is good (e.g., a strong electric field), the packet type adjustment module 730 may select the fourth packet type (e.g., 3-DH5) or the third packet type (e.g., 2-DH5) for transmitting the extension packets 860 to improve sound quality. Alternatively or additionally, when the wireless transmission environment is bad (e.g., a weak electric field), the packet type adjustment module 730 may select the first packet type (e.g., 2-DH1) or the second packet type (e.g., 2-DH3) based on order of importance of each extension packet, so that the expansion packets 860 may be stably transmitted.

The audio encoder 740 may encode an input audio signal 705 using a bitrate determined by the bitrate adjustment module 720. The audio encoder 740 may divide the audio signal into a main audio signal and a residual audio signal. The audio encoder 740 may encode the main audio signal into the main packet 850 and encode the residual audio signal into the plurality of extension packets 860. The audio signal encoded by the audio encoder 740 may be transmitted to the packet configuration module 750 for packet conversion. The configuration and operation of the audio encoder 740 is further described with reference to FIG. 8 below.

The packet configuration module 750 may determine a packet type of the main packet 850 and the plurality of extension packets 860 according to the packet type determined by the packet type adjustment module 730, and may packetize audio data encoded by the audio encoder 740 into each audio packet according to the determined packet type and/or size of the packet.

The transmission module 760 may transmit the audio packet configured in the packet configuration module 750 to a reception device.

According to an embodiment, when a large amount of data for a high-quality audio service is transmitted in a wireless transmission environment, the electronic device 700 may variably adjust the size of audio data and/or a packet type of a packet to be transmitted to prevent sound interruption and maintain high-quality audio.

FIG. 8 is a diagram illustrating the configuration and operation of an audio encoder according to an embodiment. Referring to FIG. 8, the audio encoder 740 may include a Bluetooth audio encoder (BT encoder) 810, an integer modified discrete cosine transform (IntMDCT) module 820, and an inverse quantization module 830, and a lossless coding module 840.

The audio signal 705 input to the audio encoder 740 may be encoded through the BT encoder 810 used in audio streaming The BT encoder 810 may perform an operation of a general audio codec, and a signal encoded through the BT encoder 810 may be configured as the main packet 850.

The IntMDCT module 820 may convert the audio signal 705 into a signal in the frequency domain. Here, modified discrete cosine transform (MDCT) may refer to a method for converting a time domain signal into a frequency domain signal, and may be generally expressed as 'time to frequency domain transform'.

The audio encoder 740 may obtain a residual signal 835 corresponding to a difference between the audio signal 705 and a signal encoded by the inverse quantization module 830 in the frequency domain. The lossless coding module 840 may losslessly encode the residual signal 835 and divide the losslessly encoded signal into a plurality of extension packets 860. A method of encoding the residual signal 835 by dividing the residual signal 835 into the extension packets 860, performed by the audio encoder 740, is further described later with reference to FIGS. 9 and 10.

Since the BT encoder 810 performs the lossy compression, when the audio signal 705, which is the original signal, is compared with the encoded signal encoded by the BT encoder 810, signal loss may occur. Accordingly, in an embodiment, the residual signal 835 corresponding to the difference between the audio signal 705, which is the original signal, and the audio signal encoded through lossy compression by the inverse quantization module 830 may be transmitted by dividing the residual signal 835 into a plurality of extension packets 863 via lossless encoding by the lossless coding module 840. Although the plurality of extension packets 863 are not essential for streaming, the more successfully received expansion packets 863 there are, the more similar the sound quality may be to the audio signal 705, which is the original signal.

An audio decoder of a reception device may decode the main packet 850 first, such that even if only the audio signal obtained by decoding the main packet 850 is output, a sound quality level corresponding to Bluetooth audio streaming may be secured. The reception device may receive lossless audio service similar to the audio signal 705, which is the original signal, by decoding the extension packets 860 that are additionally transmitted in addition to the main packet 850 and by combining the extension packets 860 with the audio signal of the main packet 850. Thus, as the extension packets 860 are added to the main packet 850 one by one, an audio signal close to the audio signal 705, which is the original signal, may be output.

For example, in the case of UHQ audio, since encoding using a lossy compression scheme is performed, only a main packet may exist and extension packets may not exist. As is further described with reference to FIG. 18, since the UHQ audio signal may be very large in size, an electronic device (e.g., the electronic device 101 of FIGS. 1 and 3, the electronic device 500 of FIG. 5, and/or the electronic device 700 of FIG. 7) may transmit a UHQ audio packet as a 3M packet instead of a 2M packet. In such a case, the electronic device may divide the 3M packet into two small 2M packets and transmit the 2M packets according to the transmission environment.

FIG. 9 is a diagram illustrating a method of configuring a residual signal as extension packets according to an embodiment. Referring to FIG. 9, a process of an electronic device (e.g., the electronic device 101 of FIGS. 1 and 3, the electronic device 500 of FIG. 5, and/or the electronic device 700 of FIG. 7) of dividing and encoding a residual signal (e.g., the residual signal 835 of FIG. 8) into extension packets 910, 920, 930, and 940 is illustrated.

The electronic device 700 (e.g., the audio encoder 740 of FIG. 7) may classify a losslessly encoded residual signal into a plurality of regions from a most significant bit (MSB) to a least significant bit (LSB), and divide the losslessly encoded residual signal into extension packets according to the importance of the plurality of regions. The electronic device 700 may sequentially divide a region corresponding to the MSB to a region corresponding to the LSB in a bit plane 900 on which the residual signal 835 is encoded, into a first extension packet 910 having the highest importance to a fourth extension packet 940 having the lowest importance. When the residual signal 835 is classified into four regions, among the four regions, data of the residual signal 835 positioned at the MSB may correspond to the most important data, and data of the residual signal 835 positioned at the LSB may correspond to data having the lowest importance, for sound quality improvement. The MSB, as the most significant bit of a random data type, may be referred to as a left-most bit (LMB) since it is located at the left-most side.

The electronic device 700 may divide the region corresponding to the MSB into the first extension packet 910 having the highest importance and divide a region below the region corresponding to the first extension packet 910 into a second extension packet 920 having the second highest importance by, for example, a bit-plane slicing scheme. The electronic device 700 may divide a region below the region corresponding to the second extension packet 920 into a third extension packet 930 having the third highest importance. Alternatively or additionally, the electronic device 700 may divide the region corresponding to the LSB into the fourth extension packet 940 having the lowest importance. Here, the 'region corresponding to the MSB' may be understood as a region including the most significant bit. Also, the 'region corresponding to the LSB' may be understood as a region including the least significant bit.

For an embodiment, for convenience of explanation, the importance of the extension packets is described as being divided into four levels, but is not limited thereto, and the importance of the extension packets may be divided into three levels, five levels or more levels without deviating from the scope of the present disclosure.

The electronic device 700 may transmit data corresponding to each region of the bit plane 900 in which the residual signal 835 is encoded using the extension packets 910, 920, 930, and 940 corresponding to the region.

FIG. 10 is a diagram illustrating a method of configuring a residual signal as extension packets according to an embodiment. Referring to FIG. 10, a process of an electronic device (e.g., the electronic device 101 of FIGS. 1 and 3, the electronic device 500 of FIG. 5, and/or the electronic device 700 of FIG. 7) of dividing and encoding a residual signal (e.g., the residual signal 835 of FIG. 8) into extension packets 1010, 1020, 1030, and 1040 is illustrated.

The electronic device 700 (e.g., the audio encoder 740 of FIG. 7) may classify a frequency band of the losslessly encoded residual signal 835 into a plurality of bands, and divide the losslessly encoded residual signal 835 into extension packets according to the importance of the data positioned in the plurality of bands. The electronic device 700 may classify the losslessly encoded residual signal 835 into, for example, four regions according to the frequency bands, and transmit the signals in the regions corresponding to each frequency band using each of the extension packets 1010, 1020, 1030, and 1040.

When the residual signal 835 is classified according to a frequency band 1000, the data of the residual signal 835 positioned in the low frequency band may correspond to the most important data, and the data of the residual signal 835 positioned in the high frequency band may be the least important data.

In the frequency band 1000 of the residual signal 835, the electronic device 700 may sequentially divide the data positioned in the low frequency band including the lowest frequency to the data positioned in the high frequency band including the highest frequency, into the first extension packet 1010 having the highest importance to the fourth extension packet 1040 having the lowest importance.

In the frequency band 1000 of the residual signal 835, the data of the residual signal 835 positioned in the low frequency band may be the most important data, and the importance of the data may decrease as it is positioned closer to the high frequency side. The electronic device 700 may divide the residual signal 835 in the region corresponding to the low frequency band into the first extension packet 1010 having the highest importance, and may sequentially divide the residual signal 835 into a second extension packet 1020 having the second highest importance and a third extension packet 1030 having the third highest importance, as the residual signal 835 is closer to the high frequency band. The electronic device 700 may divide the data positioned in the right-most high frequency band in the frequency band 1000 into the fourth extension packet 1040 having the lowest importance.

Similar to what is illustrated in FIG. 9, for convenience of explanation, the importance of the extension packets 1010, 1020, 1030, and 1040 is described as being divided into four levels, but is not limited thereto, and the importance of the extension packets may be divided into three levels, five levels or more levels, without deviating from the scope of the present disclosure.

The electronic device 700 may transmit data corresponding to each frequency band in the frequency band 1000 of the residual signal 835 using the extension packets 1010, 1020, 1030, and 1040 corresponding to the frequency band.

Figure 11:
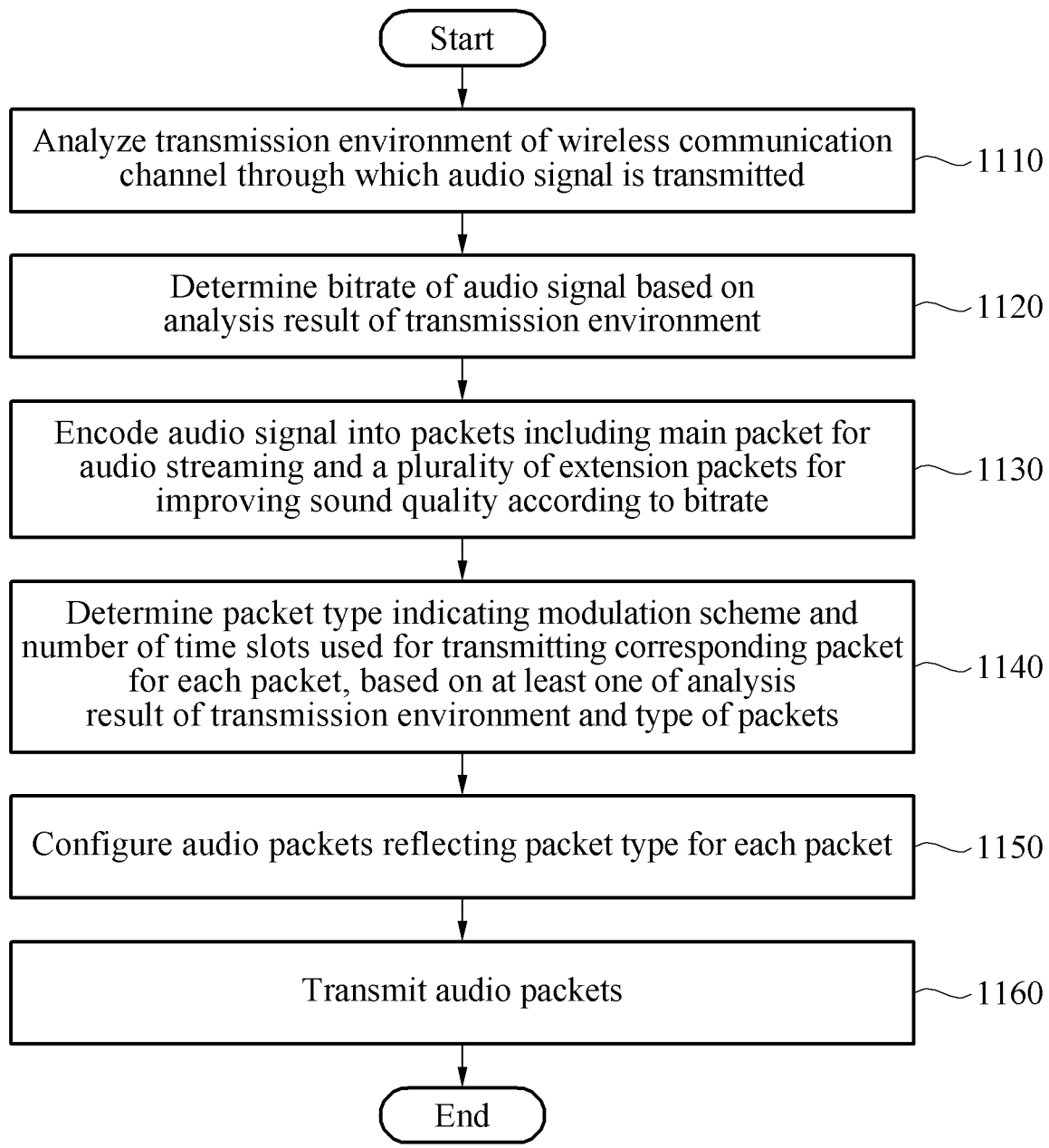
FIG. 11 is a flowchart illustrating a method of operating an electronic device according to an embodiment.

FIG. 11 is a flowchart illustrating a method of operating an electronic device according to an embodiment. In the embodiments described below, operations may be performed sequentially, but are not necessarily performed sequentially. For example, the order of the operations may be changed and at least two of the operations may be performed in parallel. Referring to FIG. 11, an electronic device (e.g., the electronic device 101 of FIGS. 1 and 3, the electronic device 500 of FIG. 5, and/or the electronic device 700 of FIG. 7) may transmit audio packets according to operations 1110 to 1160.

In operation 1110, the electronic device 500 may analyze a transmission environment of a wireless communication channel through which an audio signal is transmitted. The electronic device 500 may analyze the transmission environment based on levels of the transmission environment using at least one of information on a remaining space of a transmission buffer of the electronic device 500 that transmits the audio packets in predetermined period units, an RSSI measured by the electronic device 500, the number of Bluetooth devices connected to the electronic device 500, and a use state value of Wi-Fi used by the electronic device 500.

In operation 1120, the electronic device 500 may determine a bitrate of the audio signal based on the result of analyzing the transmission environment of operation 1110. The electronic device 500 may determine the bitrate of the audio signal based on the levels of the transmission environment analyzed in operation 1110.

In operation 1130, the electronic device 500 may encode the audio signal into packets including a main packet for audio streaming and a plurality of extension packets for improving sound quality according to the bitrate determined in operation 1120. The electronic device 500 may divide the audio signal into a main audio signal and a residual audio signal and encode the audio signals into the main packet and the plurality of extension packets. The electronic device 500 may encode the audio signal by lossy compression to configure the main packet. The electronic device 500 may losslessly encode a residual signal between the audio signal and a signal encoded by the lossy compression, and divide the losslessly encoded signal into the plurality of extension packets.

The following are examples of a method of encoding the extension packets performed by the electronic device 500. For example, the electronic device 500 may classify the encoded residual signal into a plurality of regions from the MSB to the LSB, and may divide the encoded residual signal into extension packets according to the importance of the plurality of regions. For another example, the electronic device 500 may classify a frequency band of the residual signal into a plurality of bands, and divide the frequency band of the residual signal into the extension packets according to the importance of data positioned in the plurality of bands.

In operation 1140, the electronic device 500 may determine a packet type indicating a modulation scheme and the number of time slots used for transmitting the corresponding packet for each packet, based on at least one of the result of analyzing the transmission environment analyzed in operation 1110 and the type of each packet. For example, when the type of the corresponding packet is the main packet, the environment 500 may determine a first packet type for stable transmission of the main packet regardless of the result of analyzing the transmission environment. Alternatively or additionally, when the type of the corresponding packet is the extension packet, the electronic device 500 may determine the packet type of the extension packet to be any one of, for example, a first packet type to a fourth packet type, based on at least one of the level of the transmission environment and the importance of the extension packet.

In operation 1150, the electronic device 500 may configure audio packets reflecting the packet type determined in operation 1140 for each packet.

In operation 1160, the electronic device 500 may transmit the audio packets configured in operation 1150.

Figure 12:
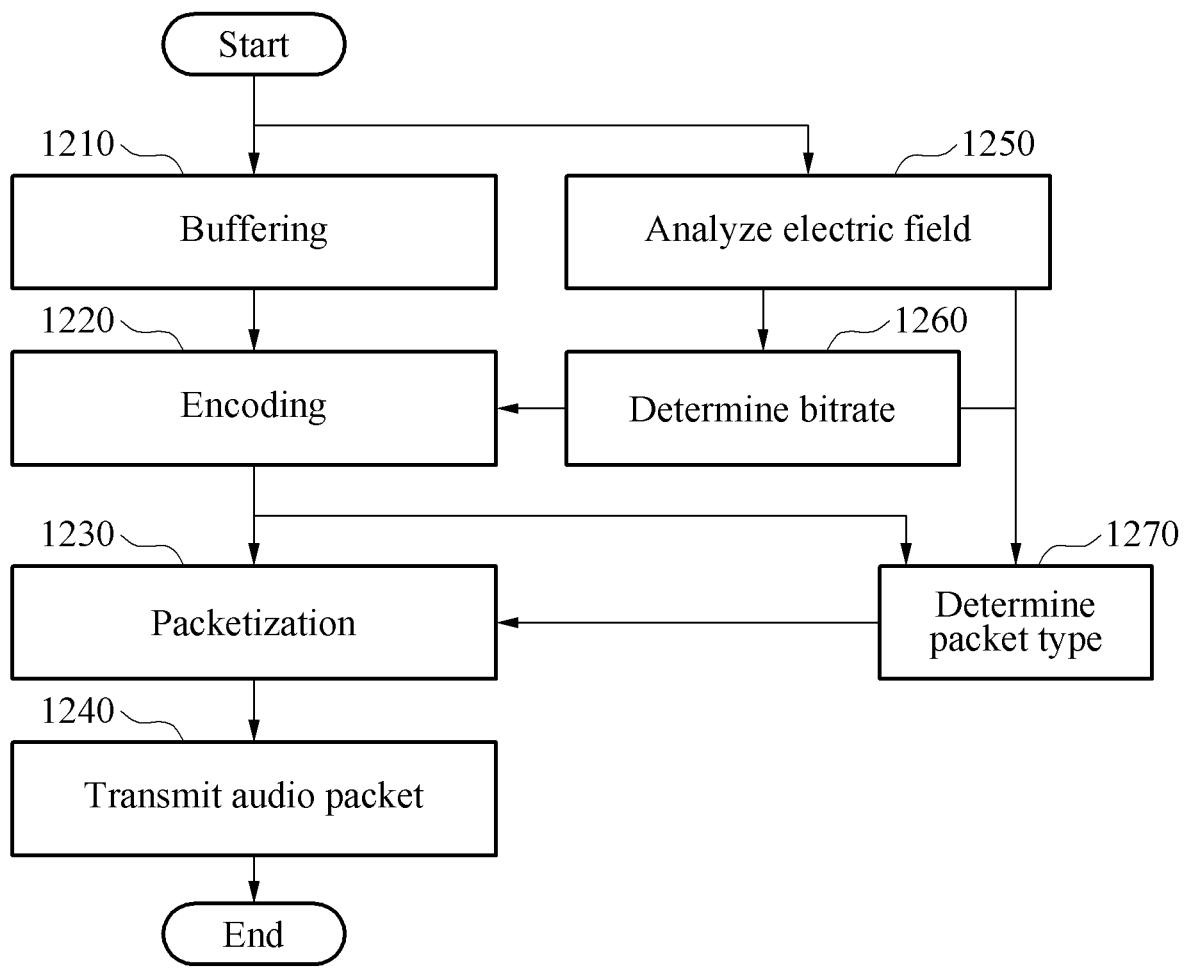
FIG. 12 is a flowchart illustrating a method of operating an electronic device according to an embodiment.

FIG. 12 is a flowchart illustrating a method of operating an electronic device according to an embodiment. In the embodiments described below, operations may be performed sequentially, but are not necessarily performed sequentially. For example, the order of the operations may be changed and at least two of the operations may be performed in parallel.

Referring to FIG. 12, an electronic device (e.g., the electronic device 101 of FIGS. 1 and 3, the electronic device 500 of FIG. 5, and/or the electronic device 700 of FIG. 7) may perform audio signal encoding and packet transmission through operations 1210 to 1270 when, for example, audio streaming is performed using a TWS headset.

In operation 1210, the electronic device 500 may buffer an input audio signal in an input buffer.

In operation 1250 together with operation 1210, the electronic device 500 may analyze an electric field of a transmission environment to which the input audio signal is transmitted.

In operation 1260, the electronic device 500 may determine a bitrate based on the result of analyzing the electric field of the transmission environment of operation 1250. For example, when the transmission environment according to the analyzing of the electric field is better than (e.g., exceeds) a predetermined threshold, the electronic device 500 may set a high bitrate, and/or when the transmission environment according to the analysis of the electric field is worse than (e.g., is inferior to) the predetermined threshold, the electronic device 500 may set a low bitrate.

In operation 1220, the electronic device 500 may encode the audio signal stored in the input buffer in operation 1210 using the bitrate set in operation 1260. When a high-capacity audio signal needs to be transmitted, such as lossless audio, the electronic device 500 may separate the audio signal into a main audio signal and a residual audio signal and encode the audio signal into a main packet and a plurality of extension packets.

In operation 1270, the electronic device 500 may determine a packet type considering the result of analyzing the electric field of the transmission environment of operation 1250 and the type of the packet. For example, when the wireless transmission environment is good, the electronic device 500 may determine a packet type in which a large amount of data can be transmitted, such as 3-DH5 corresponding to the lower right direction shown in the table 600 of FIG. 6A, and uses a large number of time slots. Alternatively or additionally, when the wireless transmission environment is not good, the electronic device 500 may determine a stable packet type in which a small amount of data can be transmitted, such as 2-DH1 corresponding to the upper left direction shown in the table 600 of FIG. 6A, and uses a small number of time slots.

In operation 1230, the electronic device 500 may packetize the data encoded in operation 1220 according to the packet type determined in operation 1270.

In operation 1240, the electronic device 500 may transmit the audio packet packetized in operation 1230.

Figure 13:
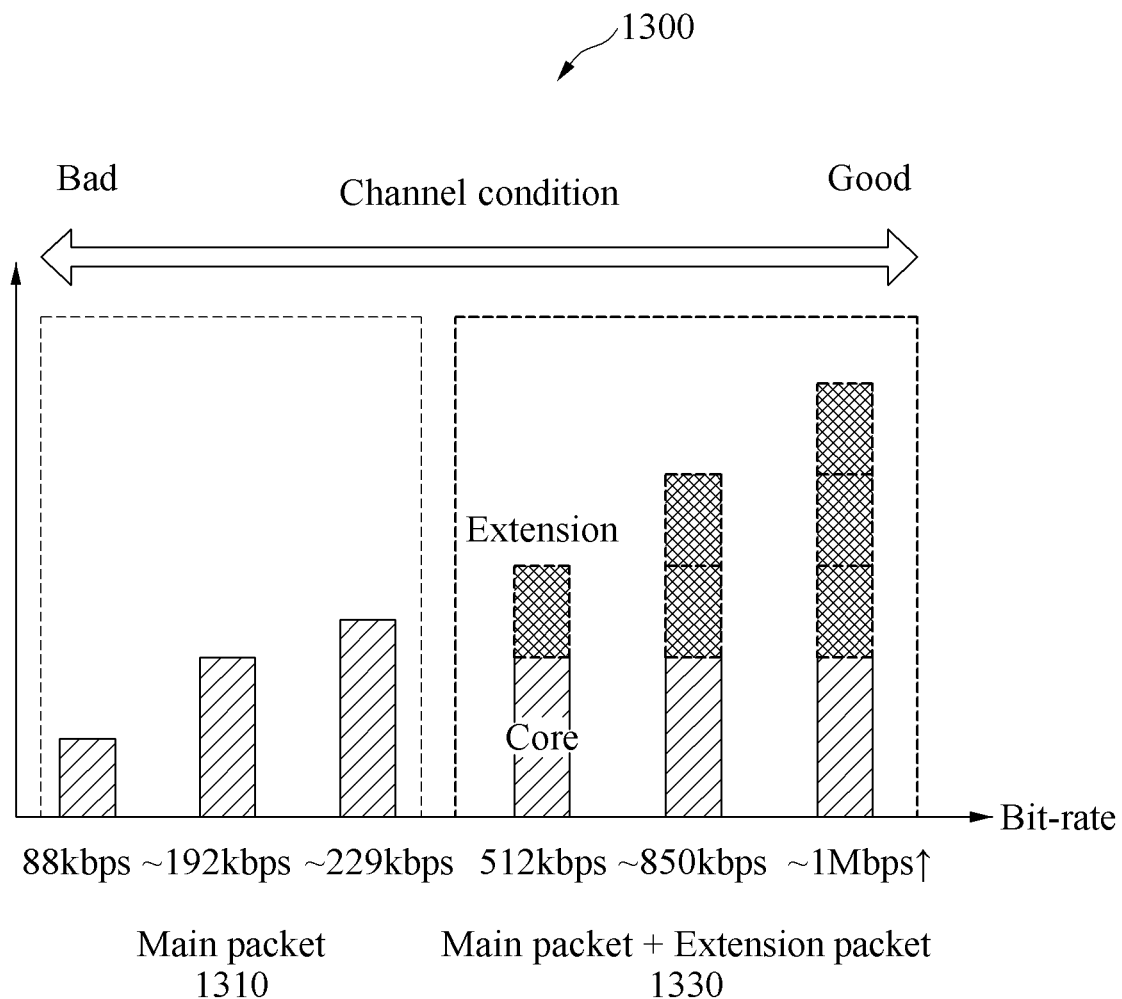
FIG. 13 is a diagram illustrating a method of adjusting a packet type in audio streaming according to an embodiment.

FIG. 13 is a diagram illustrating a method of adjusting a packet type in audio streaming according to an embodiment. Referring to FIG. 13, a diagram 1300 illustrating a method of an electronic device (e.g., the electronic device 101 of FIGS. 1 and 3, the electronic device 500 of FIG. 5, and/or the electronic device 700 of FIG. 7) for adjusting packet types in scalable lossless audio streaming for HiFi audio is shown.

A main packet 1310, as shown in FIG. 13, may be encoded by, for example, a core codec such as Samsung scalable codec (SSC). The main packet 1310 (e.g., the main packet 850 of FIG. 8) may be transmitted at a bitrate of, for example, 88 to 192 kbps or 88 to 229 kbps according to the transmission environment. In a packet 1330 in which the main packet and extension packets (e.g., the extension packets 860 of FIG. 8) are combined, the main packet may be an important packet that needs to be transmitted whenever audio data is encoded, and the extension packets may be sequentially transmitted when the transmission environment is good. The extension packets may correspond to data obtained by encoding a residual signal (e.g., the residual signal 835 of FIG. 8) corresponding to a difference between original audio data and the main packet 1310. The residual signal 835 may be divided into several extension packets and transmitted, and when all of the extension packets have been successfully transmitted and all residual signals 835 have been successfully transmitted, a reception device may perform lossless encoding.

According to a result of analyzing the transmission environment, when a channel condition (e.g., the transmission environment) is bad, the electronic device 500 may transmit the main packet 1310 by the most stable packet type such as 2-DH3 at a low bitrate of 88 kbps, and if the channel condition improves, the electronic device 500 may start transmitting the main packet 1310 at a gradually higher bitrate, such as 192 kbps or 229 kbps, by a packet type having an increased number of time slots, such as 2-DH5. Alternatively or additionally, if the channel condition gradually improves, the electronic device 500 may start transmitting a plurality of packets 1330 consisting of a main (core) packet and extension packets by a plurality of 2-DH3 packet types at a bitrate of 512 kbps, and if the channel condition gradually improves, the electronic device 500 may start transmitting the packet 1330 by a packet type having a larger transmission capacity, such as 2-DH5, or by a 3-DH5 packet type having a greater number of time slots used to transmit the extension packets in the packet 1330.

Figure 14:
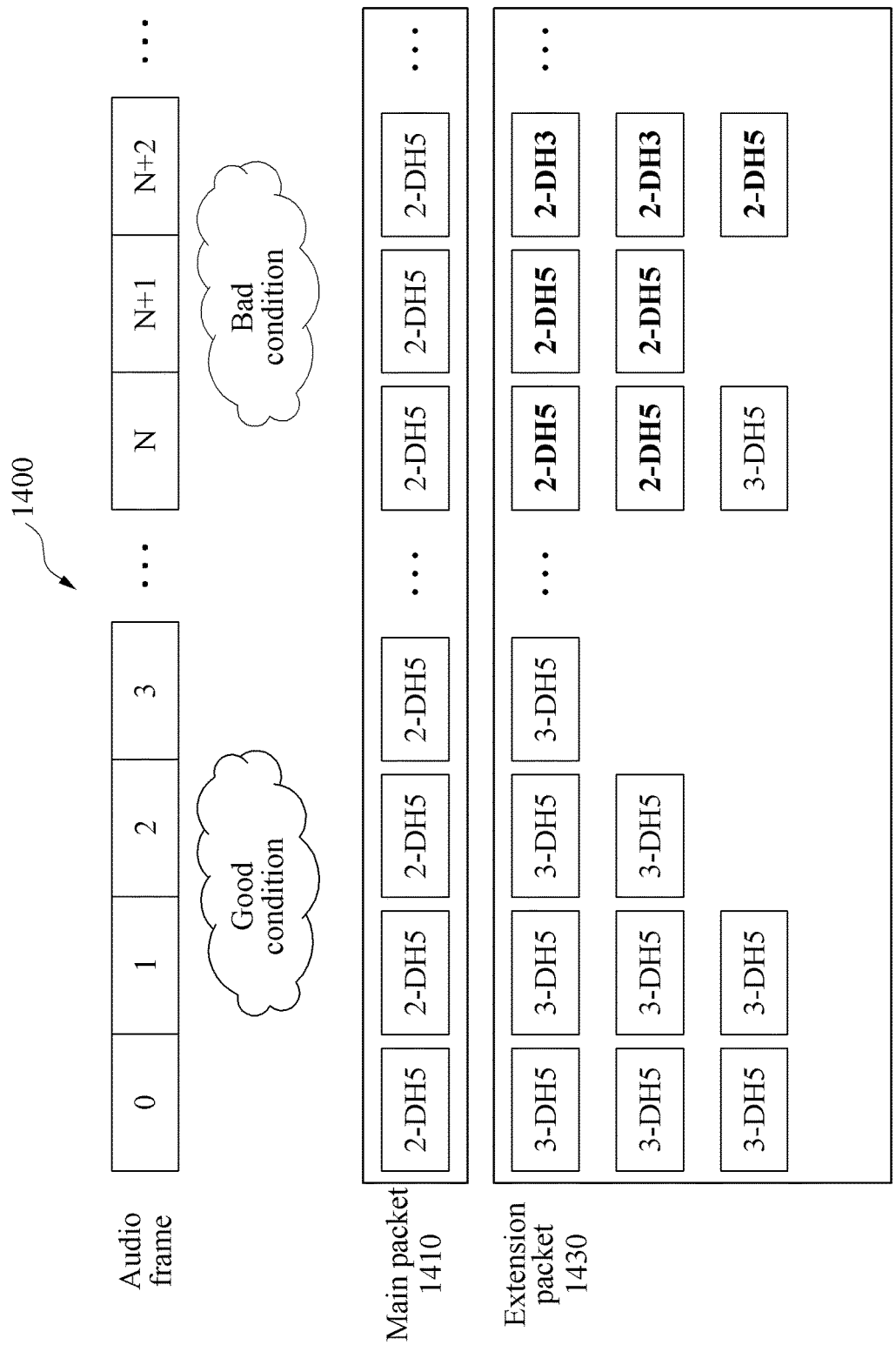
FIG. 14 is a diagram illustrating a method of transmitting an audio packet in a wireless transmission environment according to an embodiment.

FIG. 14 is a diagram illustrating a method of transmitting an audio packet in a wireless transmission environment according to an embodiment. Referring to FIG. 14, a diagram 1400 illustrating packet types used by an electronic device (e.g., the electronic device 101 of FIGS. 1 and 3, the electronic device 500 of FIG. 5, and/or the electronic device 700 of FIG. 7) to transmit a main packet 1410 (e.g., the main packet 850 of FIG. 8) and an extension packet 1430 (e.g., the extension packets 860 of FIG. 8) in the case of a good wireless transmission environment and a bad wireless transmission environment is shown.

As described above, since the main packet 1410 needs to be transmitted without interruption regardless of a transmission environment, the electronic device 500 may transmit the main packet 1410 by a 2M packet that is highly robust against sound interruption. The electronic device 500 may transmit the main packet 1410 by, for example, a 2-DH5 packet type regardless of a result of analyzing the wireless transmission environment.

When the transmission environment is good, since it is important to transmit as many residual signals as possible to maintain high sound quality, the electronic device 500 may transmit the extension packet 1430 using a 3M packet containing a large amount of data. If the transmission environment gradually deteriorates, packet transmission may fail. Therefore, when the transmission environment is below a predetermined level, the electronic device 500 may convert the 3M packet that was transmitting the expansion packet 1430 into a 2M packet and perform the transmission. Using 2M packets may reduce the amount of data that can be transmitted by the electronic device 500, but may increase the probability of successful transmission, such that the packets may be transmitted stably. If the transmission environment deteriorates, the electronic device 500 may convert a packet type from a 2-DH5 packet using 5 time slots to a 2-DH3 packet using 3 time slots, in a 2M packet. If the transmission environment further deteriorates, the electronic device 500 may transmit only the main packet 1410 and maintain robustness against sound interruption by controlling a bitrate at which the main packet 1410 is transmitted.

Figure 15:
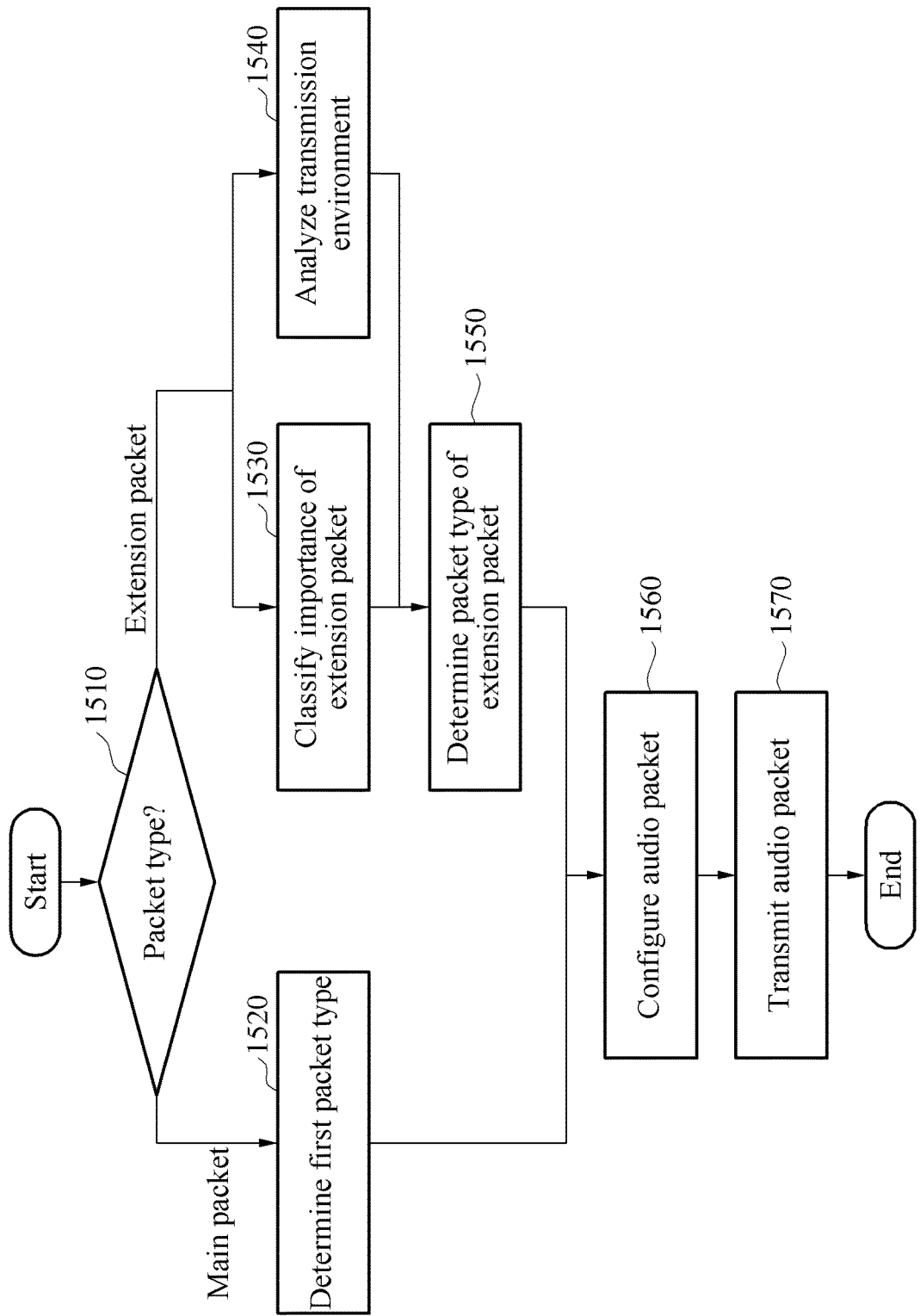
FIG. 15 is a flowchart illustrating a method of operating an electronic device according to an embodiment.

FIG. 15 is a flowchart illustrating a method of operating an electronic device according to an embodiment. In the embodiments described below, operations may be performed sequentially, but are not necessarily performed sequentially. For example, the order of the operations may be changed and at least two of the operations may be performed in parallel.

Referring to FIG. 15, an electronic device (e.g., the electronic device 101 of FIGS. 1 and 3, the electronic device 500 of FIG. 5, and/or the electronic device 700 of FIG. 7) may select and transmit a packet type of a scalable lossless audio packet through operations 1510 to 1570.

In operation 1510, the electronic device 500 may determine whether a type of a packet to be transmitted is a main packet (e.g., the main packet 850 of FIG. 8 and/or the main packet 1410 of FIG. 14) or an extension packet (e.g., the extension packets 860 of FIG. 8, and/or the extension packet 1430 of FIG. 14).

When the type of the packet to be transmitted is determined to be the main packet 1410 in operation 1510, in operation 1520, the electronic device 500 may determine a packet type to transmit the main packet 1410 to be a first packet type. The first packet type may be, for example, 2-DH1 or 2-DH3.

When the type of the packet to be transmitted is determined to be the extension packet 1430 in operation 1510, the electronic device 500 may classify the importance of the corresponding extension packet 1430 in operation 1530, and analyze a transmission environment in operation 1540. Operation 1530 and operation 1540 may be performed simultaneously or may each be performed at different predetermined times, and operation 1540 may be performed first, and operation 1530 may be performed second.

When the importance of the extension packet 1430 is classified in operation 1530 and the analysis of the transmission environment is completed in operation 1540, in operation 1550, the electronic device 500 may determine the packet type of the extension packet 1430 to be any one of a first packet type to a fourth packet type based on the importance of the extension packet 1430 and the result of analyzing the transmission environment.

In operation 1560, the electronic device 500 may configure an audio packet according to the first packet type determined in operation 1520 or according to the packet type determined in operation 1550.

In operation 1570, the electronic device 500 may transmit the audio packet configured in operation 1560.

Figure 16:
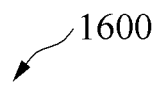
FIG. 16 is a diagram illustrating a packet payload size for each transmission bitrate of a Ultra-High Quality (UHQ) audio signal according to an embodiment.

FIG. 16 is a diagram illustrating a packet payload size for each transmission bitrate of a UHQ audio signal according to an embodiment.

According to an embodiment, when streaming UHQ audio, an electronic device (e.g., the electronic device 101 of FIGS. 1 and 3, the electronic device 500 of FIG. 5, and/or the electronic device 700 of FIG. 7) may adjust a packet type according to a transmission environment to maintain robustness against sound interruption.

UHQ audio generally may correspond to a 96 kHz/24 bit audio packet, and may have more than twice the data compared to a 44.1 kHz/16 bit audio packet, which is a commonly used audio format. Table 1600 may indicate a packet payload size for each bitrate and a packet type required for transmission when UHQ audio is streamed.

When the transmission environment is good, the electronic device 500 may transmit an encoded audio signal at a bitrate of, for example, 328 kbps every 18 msec. In this case, a 3-DH5 packet having a 3M packet type may be used. If the transmission environment gradually deteriorates, the electronic device 500 may start transmitting a 2-DH5 packet having a 2M packet type every 9 msec at a bitrate of 328 kbps for more stable transmission. Thereafter, if the transmission environment further deteriorates, the electronic device 500 may change the bitrate to 256 kbps to reduce the amount of data to be transmitted, thereby enabling more stable transmission. The electronic device 500 may transmit data by the 2-DH5 packet type every 18 msec at a bitrate of, for example, 256 kbps, and then change the packet type if the transmission environment further deteriorates, so that a 2-DH3 packet type audio packet may be transmitted every 9 msec. Since the 2-DH3 packet type uses less time slots compared to the 2-DH5 packet type, the electronic device 500 may transmit audio packets more stably.

Figure 17:
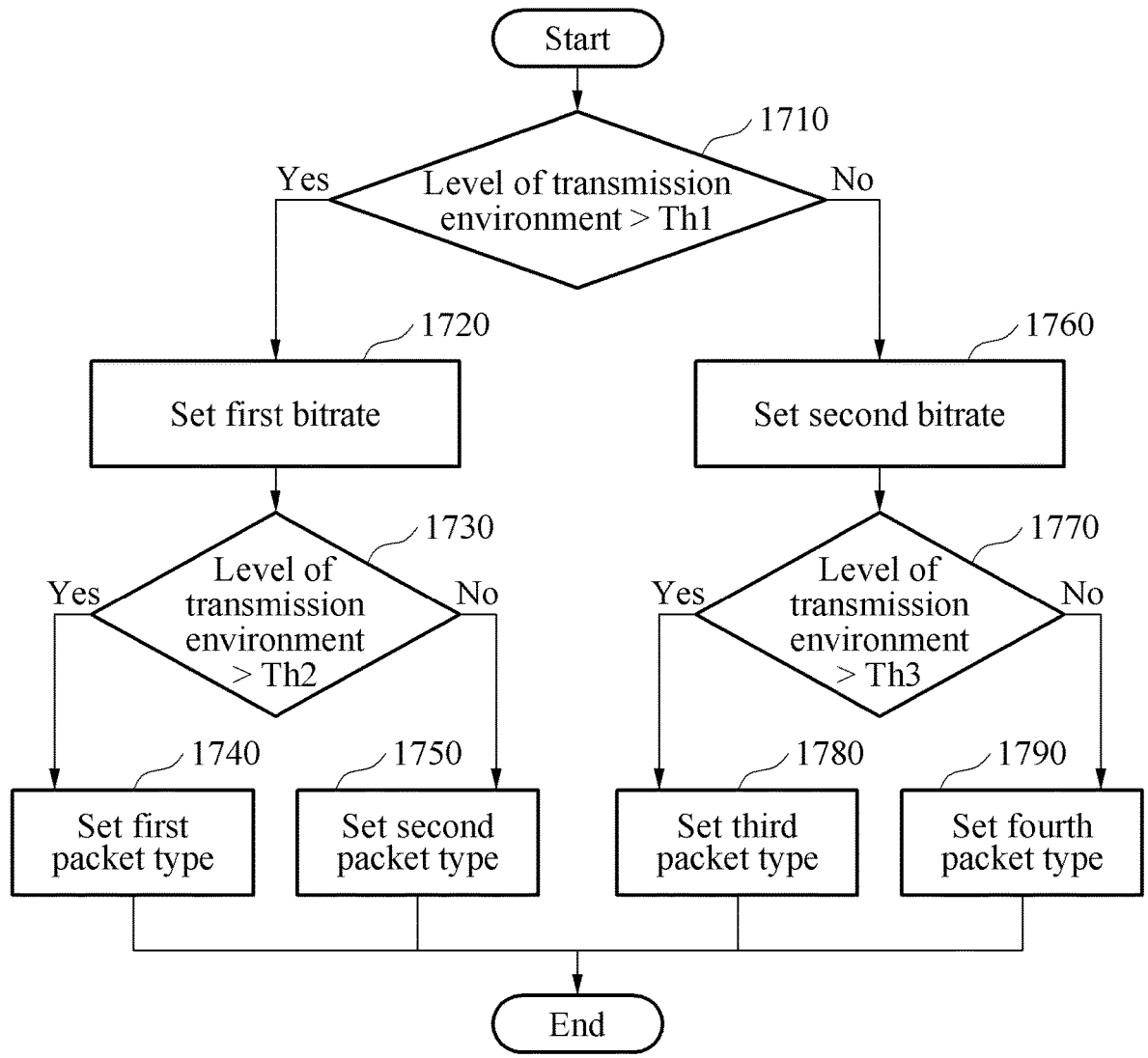
FIG. 17 is a flowchart illustrating a method of operating an electronic device according to an embodiment.

FIG. 17 is a flowchart illustrating a method of operating an electronic device according to an embodiment. In the embodiments described below, operations may be performed sequentially, but are not necessarily performed sequentially. For example, the order of the operations may be changed and at least two of the operations may be performed in parallel.

Referring to FIG. 17, through operations 1710 to 1790, an electronic device (e.g., the electronic device 101 of FIGS. 1 and 3, the electronic device 500 of FIG. 5, and/or the electronic device 700 of FIG. 7) may adjust a packet type of, for example, a 96 kHz/24 bit UHQ audio packet, according to a transmission environment in which, for example, 96 kHz/24 bit UHQ audio streaming is performed.

In operation 1710, the electronic device 500 may determine whether the level of a transmission environment according to result of analyzing the transmission environment is greater than a first threshold Th1.

When it is determined in operation 1710 that the level of the transmission environment is greater than the first threshold Th1, in operation 1720, the electronic device 500 may determine a bitrate of a UHQ audio signal to be a first bitrate.

After the first bitrate is determined in operation 1720, in operation 1730, the electronic device 500 may again determine whether the level of the transmission environment is greater than a second threshold Th2.

When it is determined in operation 1730 that the level of the transmission environment is greater than the second threshold Th2, in operation 1740, the electronic device 500 may set a first packet type to be a packet type to transmit a UHQ audio packet. When it is determined in operation 1730 that the level of the transmission environment is less than or equal to the second threshold Th2, in operation 1750, the electronic device 500 may set a second packet type to be a packet type to transmit a UHQ audio packet.

Alternatively or additionally, when it is determined in operation 1710 that the level of the transmission environment is less than or equal to the first threshold Th1, in operation 1760, the electronic device 500 may determine a bitrate of a UHQ audio signal to be a second bitrate.

After the second bitrate is determined in operation 1760, in operation 1770, the electronic device 500 may again determine whether the level of the transmission environment is greater than a third threshold Th3.

When it is determined in operation 1770 that the level of the transmission environment is greater than the third threshold Th3, in operation 1780, the electronic device 500 may set a third packet type to be a packet type to transmit a UHQ audio packet. When it is determined in operation 1770 that the level of the transmission environment is less than or equal to the third threshold Th3, in operation 1790, the electronic device 500 may set a fourth packet type to be a packet type to transmit a UHQ audio packet.

For example, in the case of high-quality audio such as UHQ audio or HiFi audio, the size of transmitted data may be greater than that of general compact-disc (CD) quality (e.g., 44.1 kHz/16 bit) audio. In this case, the electronic device 500 may adjust the bitrate and packet type by further subdividing a wireless transmission environment. The electronic device 500 may transmit an audio packet using different packet types even at the same bitrate according to a more detailed classification of a transmission environment.

Figure 18:
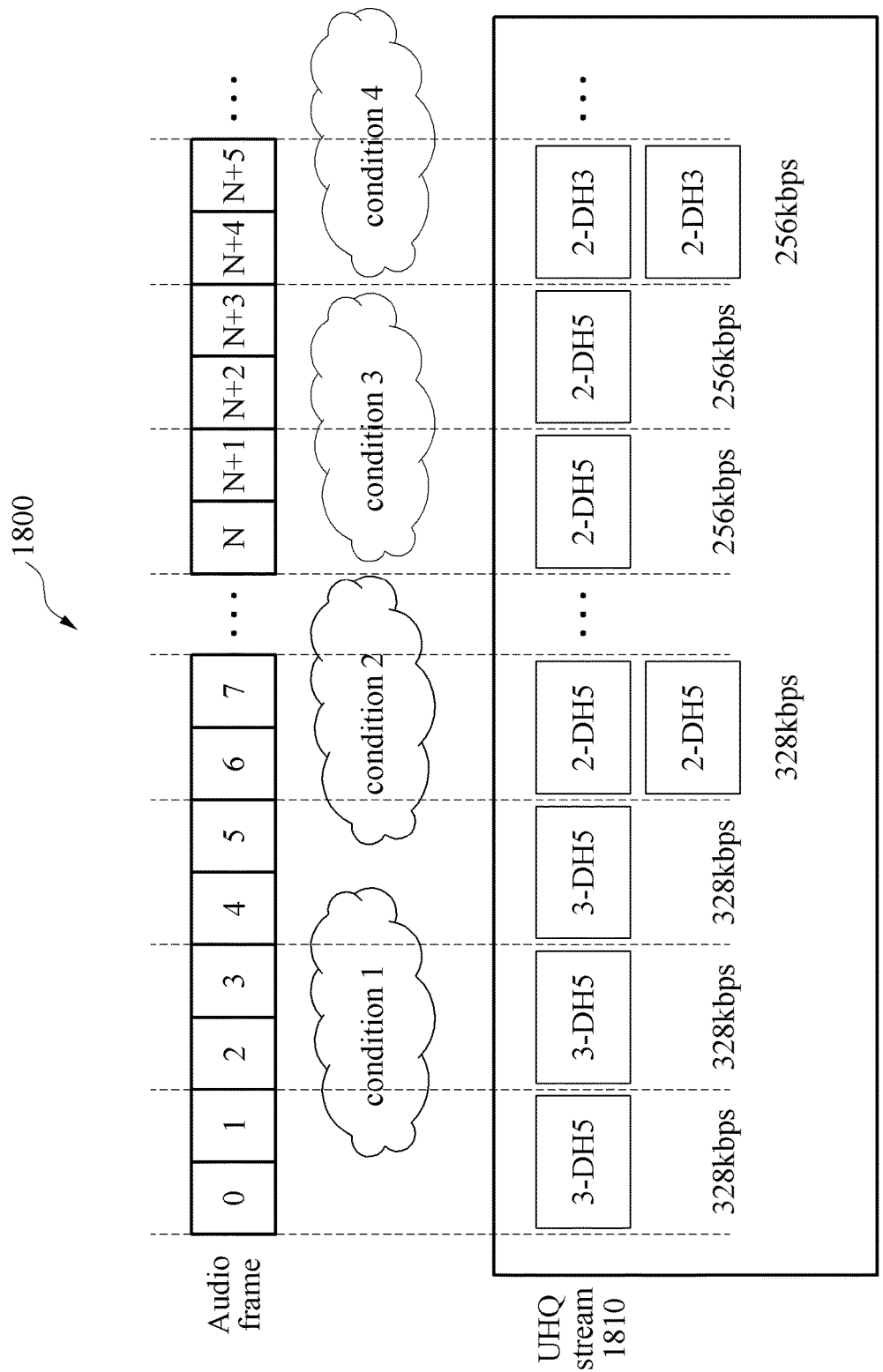
FIG. 18 is a diagram illustrating a method of transmitting an audio packet in a wireless transmission environment according to an embodiment.

FIG. 18 is a diagram illustrating a method of transmitting an audio packet in a wireless transmission environment according to an embodiment. Referring to FIG. 18, a diagram 1800 illustrating a process of an electronic device (e.g., the electronic device 101 of FIGS. 1 and 3, the electronic device 500 of FIG. 5, and/or the electronic device 700 of FIG. 7) changing a packet type according to a transmission environment when streaming a UHQ audio packet is shown.

The electronic device 500 may transmit audio data resistant to radio errors by simultaneously adjusting a bitrate and a packet type according to a wireless transmission environment and selecting an appropriate packet according to the transmission environment in a TWS wireless headset using Bluetooth.

For example, when audio data is divided into a plurality of packets to transmit a high-capacity audio frame, such as UHQ audio, and transmitted, the electronic device 500 may simultaneously adjust a bitrate and a packet type according to the wireless transmission environment so that sound quality may be preserved and sound interruption may be prevented even when the transmission environment is bad. The electronic device 500 may transmit, for example, an audio stream according to a 3-DH5 packet type at a bitrate of 328 kbps when a transmission environment is good. In this example, when the audio stream has a high capacity like a UHQ stream 1810, the electronic device 500 may divide the audio stream into two audio packets having a 2-DH5 packet type and transmit the corresponding audio stream in lieu of the 3-DH5 packet type. Thereafter, when the transmission environment deteriorates, the electronic device 500 may start transmitting the audio stream by the 2-DH5 packet type at a bitrate of 256 kbps. Similarly, when the audio stream has a high capacity like a UHQ stream 1810, the electronic device 500 may divide the audio stream into two audio packets having a 2-DH2 packet type and transmit the corresponding audio stream in lieu of the 2-DH5 packet type.

Thus, the electronic device 500 may divide a packet and determine a packet type by further considering the data amount (e.g., a high capacity such as UHQ audio) of an audio signal in addition to a result of analyzing the transmission environment.

According to an embodiment, an electronic device 101, 500, and 700 may include a memory 130 and 510 configured to store computer-executable instructions, and a processor 120 and 530 configured to execute the computer-executable instructions by accessing the memory 130 and 510, wherein, when the instructions are executed by the processor 120 and 530, the processor 120 and 530 may be configured to, based on a result of analyzing a transmission environment of a wireless communication channel through which an audio signal 705 is transmitted, determine a bitrate of the audio signal 705, encode the audio signal 705 into packets including a main packet 850 and 1410 for audio streaming and a plurality of extension packets 860, 910, 920, 930, 940, 1010, 1020, 1030, 1040, 1430 for sound quality improvement, according to the bitrate, based on at least one of the result of analyzing the transmission environment and a type of the packets, determine a packet type indicating a modulation scheme and the number of time slots used for transmitting the corresponding packet for each packet, and configure and transmit audio packets reflecting the packet type for each packet.

According to an embodiment, when the instructions are executed by the processor 120 and 530, the processor 120 and 530 may be configured to analyze the transmission environment based on levels of the transmission environment using at least one of information on remaining space of a transmission buffer of the electronic device 101, 500, and 700 that transmits the audio packets in predetermined period units, an RSSI measured by the electronic device 101, 500, and 700, the number of Bluetooth devices connected to the electronic device 101, 500, and 700, and a use state value of Wi-Fi used by the electronic device 101, 500, and 700.

According to an embodiment, when the instructions are executed by the processor 120 and 530, the processor 120 and 530 may be configured to determine the bitrate of the audio signal 705 based on the levels of the transmission environment.

According to an embodiment, when the instructions are executed by the processor 120 and 530, the processor 120 and 530 may be configured to divide the audio signal 705 into a main audio signal 705 and a residual audio signal 705 and encode into the main packet 850, 1410 and the plurality of extension packets 860, 910, 920, 930, 940, 1010, 1020, 1030, 1040, and 1430.

According to an embodiment, when the instructions are executed by the processor 120 and 530, the processor 120 and 530 may be configured to encode the audio signal 705 by lossy compression, and configure the encoded signal into the main packet, and losslessly encode a residual signal 835 between the audio signal 705 and the signal encoded by the lossy compression, and divide the losslessly encoded signal into the plurality of extension packets 860, 910, 920, 930, 940, 1010, 1020, 1030, 1040, and 1430.

According to an embodiment, when the instructions are executed by the processor 120 and 530, the processor 120 and 530 may be configured to classify the encoded residual signal 835 into a plurality of regions from a MSB to a LSB, and divide the encoded residual signal into the extension packets 860, 910, 920, 930, 940, 1010, 1020, 1030, 1040, and 1430 according to the importance of the plurality of regions.

According to an embodiment, when the instructions are executed by the processor 120 and 530, the processor 120 and 530 may be configured to, in a bit plane on which the residual signal 835 is encoded, sequentially divide a region corresponding to the MSB to a region corresponding to the LSB into a first extension packet 910 and 1010 having the highest importance to a fourth extension packet 940 and 1040 having the lowest importance.

According to an embodiment, when the instructions are executed by the processor 120 and 530, the processor 120 and 530 may be configured to classify a frequency band of the residual signal 835 into a plurality of bands, and divide the frequency band of the residual signal 835 into the extension packets 860, 910, 920, 930, 940, 1010, 1020, 1030, 1040, and 1430 according to the importance of data positioned in the plurality of bands.

According to an embodiment, when the instructions are executed by the processor 120 and 530, the processor 120 and 530 may be configured to sequentially divide data positioned in a low frequency band including the lowest frequency to data positioned in a high frequency band including the highest frequency, among the plurality of bands, into the first extension packet 910 and 1010 having the highest importance to the fourth extension packet 940 and 1040 having the lowest importance.

According to an embodiment, when the instructions are executed by the processor 120 and 530, the processor 120 and 530 may be configured to, when the type of the corresponding packet is the main packet 850 and 1410, determine a first packet type for stable transmission of the main packet 850 and 1410 regardless of the result of analyzing the transmission environment.

According to an embodiment, when the instructions are executed by the processor 120 and 530, the processor 120 and 530 may be configured to, when the type of the corresponding packet is the extension packet 860, 910, 920, 930, 940, 1010, 1020, 1030, 1040, and 1430, determine the packet type of the extension packet 860, 910, 920, 930, 940, 1010, 1020, 1030, 1040, and 1430 based on at least one of the level of the transmission environment and the importance of the extension packet.

According to an embodiment, when the instructions are executed by the processor 120 and 530, the processor 120 and 530 may be configured to divide the packet and determine the packet type by further considering the data amount of the audio signal 705 in addition to the result of analyzing the transmission environment.

According to an embodiment, a method of operating an electronic device 101, 500, and 700 may include analyzing a transmission environment of a wireless communication channel through which an audio signal 705 is transmitted, based on the analysis result of the transmission environment, determining a bitrate of the audio signal 705, encoding the audio signal 705 into packets including a main packet 850 and 1410 for audio streaming and a plurality of extension packets 860, 910, 920, 930, 940, 1010, 1020, 1030, 1040, and 1430 for sound quality improvement, according to the bitrate, based on at least one of the analysis result of the transmission environment and a type of the packets, determining a packet type indicating a modulation scheme and the number of time slots used for transmitting the corresponding packet for each packet, and configuring and transmitting audio packets reflecting the packet type for each packet.

According to an embodiment, the analyzing of the transmission environment may include analyzing the transmission environment based on levels of the transmission environment using at least one of information on remaining space of a transmission buffer of the electronic device 101, 500, and 700 that transmits the audio packets in predetermined period units, an RSSI measured by the electronic device 101, 500, and 700, the number of Bluetooth devices connected to the electronic device 101, 500, and 700, and a use state value of Wi-Fi used by the electronic device 101, 500, and 700, and the determining of the bitrate of the audio signal 705 may include determining the bitrate of the audio signal 705 based on the levels of the transmission environment.

According to an embodiment, the encoding may include dividing the audio signal 705 into a main audio signal 705 and a residual audio signal 705 and encoding into the main packet 850, 1410 and the plurality of extension packets 860, 910, 920, 930, 940, 1010, 1020, 1030, 1040, and 1430.

According to an embodiment, the encoding may include encoding the audio signal 705 by lossy compression, and configuring the encoded audio signal into the main packet 850 and 1410, and losslessly encoding a residual signal 835 between the audio signal 705 and the signal encoded by the lossy compression, and dividing the losslessly encoded signal into the plurality of extension packets 860, 910, 920, 930, 940, 1010, 1020, 1030, 1040, and 1430.

According to an embodiment, the dividing into the plurality of extension packets 860, 910, 920, 930, 940, 1010, 1020, 1030, 1040, and 1430 and the encoding may include any one of classifying the encoded residual signal 835 into a plurality of regions from an MSB to an LSB, and dividing the encoded residual signal 835 into the extension packets 860, 910, 920, 930, 940, 1010, 1020, 1030, 1040, and 1430 according to the importance of the plurality of regions, and classifying a frequency band of the residual signal 835 into a plurality of bands, and dividing the frequency band of the residual signal into the extension packets 860, 910, 920, 930, 940, 1010, 1020, 1030, 1040, and 1430 according to the importance of data positioned in the plurality of bands.

According to an embodiment, the determining of the packet type may include at least one of, when the type of the corresponding packet is the main packet 850 and 1410, determining a first packet type for stable transmission of the main packet 850 and 1410 regardless of the analysis result of the transmission environment, and when the type of the corresponding packet is the extension packet 860, 910, 920, 930, 940, 1010, 1020, 1030, 1040, and 1430, determining the packet type of the extension packet 860, 910, 920, 930, 940, 1010, 1020, 1030, 1040, and 1430 based on at least one of the level of the transmission environment and the importance of the extension packet 860, 910, 920, 930, 940, 1010, 1020, 1030, 1040, and 1430.

According to an embodiment, the determining of the packet type may include, dividing the packet and determining the packet type by further considering the data amount of the audio signal 705 in addition to the result of analyzing the transmission environment.

What is claimed is:
1. An electronic device comprising:
 a memory configured to store computer-executable instructions; and
 a processor configured to execute the computer-executable instructions to:
  based on a result of analyzing a transmission environment of a wireless communication channel through which an audio signal is transmitted, determine a bitrate of the audio signal, encode the audio signal into a plurality of packets according to the bitrate, the plurality of packets comprising a main packet for audio streaming and a plurality of extension packets for sound quality improvement, select a first packet type for the main packet that minimizes a number of time slots to be used for transmitting the main packet, based on an importance of each extension packet of the plurality of extension packets and the result of the analyzing of the transmission environment, determine a second packet type indicating a modulation scheme and a number of time slots to be used for transmitting each extension packet of the plurality of extension packets, and configure and transmit audio packets reflecting a corresponding packet type for each packet of the plurality of packets.

2. The electronic device of claim 1, wherein the processor is further configured to execute the computer-executable instructions to analyze the transmission environment based on levels of the transmission environment using at least one of information on remaining space of a transmission buffer of the electronic device that transmits the audio packets in predetermined period units, a received signal strength indicator (RSSI) measured by the electronic device, a number of Bluetooth devices connected to the electronic device, and a use state value of Wireless-Fidelity (Wi-Fi) used by the electronic device.

3. The electronic device of claim 1, wherein the processor is further configured to execute the computer-executable instructions to determine the bitrate of the audio signal based on levels of the transmission environment.

4. The electronic device of claim 1, wherein the processor is further configured to execute the computer-executable instructions to:

divide the audio signal into a main audio signal and a residual audio signal, encode the main audio signal into the main packet, and encode the residual audio signal into the plurality of extension packets.

5. The electronic device of claim 1, wherein the processor is further configured to execute the computer-executable instructions to:

encode the audio signal using lossy compression to generate an encoded audio signal, configure the encoded audio signal as the main packet, losslessly encode a residual signal corresponding to a difference between the audio signal and the encoded audio signal; and divide the losslessly encoded residual signal into the plurality of extension packets.

6. The electronic device of claim 5, wherein the processor is further configured to execute the computer-executable instructions to:

classify the losslessly encoded residual signal into a plurality of regions from a most significant bit (MSB) to a least significant bit (LSB), and divide the losslessly encoded residual signal into the plurality of extension packets according to an importance of the plurality of regions.

7. The electronic device of claim 6, wherein the processor is further configured to execute the computer-executable instructions to sequentially divide, in a bit plane on which the losslessly encoded residual signal is encoded, a region corresponding to the MSB to a region corresponding to the LSB into a first extension packet having highest importance to a fourth extension packet having lowest importance.

8. The electronic device of claim 5, wherein the processor is further configured to execute the computer-executable instructions to:

classify a frequency band of the residual signal into a plurality of bands, and divide the frequency band of the residual signal into the plurality of extension packets according to importance of data positioned in the plurality of bands.

9. The electronic device of claim 8, wherein the processor is further configured to execute the computer-executable instructions to sequentially divide data positioned in a low frequency band including a lowest frequency to data positioned in a high frequency band including a highest frequency, from among the plurality of bands, into a first extension packet having a highest importance to a fourth extension packet having a lowest importance.

10. The electronic device of claim 1, wherein the processor is further configured to execute the computer-executable instructions to, based on a packet being an extension packet, determine the second packet type of each extension packet of the plurality of extension packets based on at least one of a level of the transmission environment and an importance of the extension packet.

11. The electronic device of claim 1, wherein the processor is further configured to execute the computer-executable instructions to:

divide the plurality of packets, and determine, for each packet of the plurality of packets, the second packet type further based on a data amount of the audio signal.

12. An operating method of an electronic device, the operating method comprising:

analyzing a transmission environment of a wireless communication channel through which an audio signal is transmitted;

based on a result of the analyzing of the transmission environment, determining a bitrate of the audio signal;

encoding the audio signal into a plurality of packets according to the bitrate, the plurality of packets comprising a main packet for audio streaming and a plurality of extension packets for sound quality improvement;

selecting a first packet type for the main packet that minimizes a number of time slots to be used for transmitting the main packet, based on an importance of each extension packet of the plurality of extension packets and the analyzing of the transmission environment, determining a second packet type indicating a modulation scheme and a number of time slots to be used for transmitting each extension packet of the plurality of packets;

configuring audio packets reflecting a corresponding packet type for each packet of the plurality of packets; and transmitting the audio packets.

13. The operating method of claim 12, wherein the analyzing the transmission environment comprises analyzing the transmission environment based on levels of the transmission environment using at least one of information on a remaining space of a transmission buffer of the electronic device that transmits the audio packets in predetermined period units, a received signal strength indicator (RSSI) measured by the electronic device, number of Bluetooth devices connected to the electronic device, and a use state value of Wireless-Fidelity (Wi-Fi) used by the electronic device, and wherein the determining the bitrate of the audio signal comprises determining the bitrate of the audio signal based on the levels of the transmission environment.

14. The operating method of claim 12, wherein the encoding comprises:

dividing the audio signal into a main audio signal and a residual audio signal;

encoding the main audio signal into the main packet; and encoding the residual audio signal into the plurality of extension packets.

15. The operating method of claim 12, wherein the encoding comprises:

encoding the audio signal using lossy compression to generate an encoded audio signal;

configuring the encoded audio signal as the main packet;

losslessly encoding a residual signal corresponding to a difference between the audio signal and the encoded audio signal; and dividing the losslessly encoded residual signal into the plurality of extension packets.

16. The operating method of claim 15, wherein the dividing the losslessly encoded residual signal into the plurality of extension packets comprises:

classifying the losslessly encoded residual signal into a plurality of regions from a most significant bit (MSB) to a least significant bit (LSB), and dividing the losslessly encoded residual signal into the plurality of extension packets according to importance of the plurality of regions; and classifying a frequency band of the residual signal into a plurality of bands, and dividing the frequency band of the residual signal into the plurality of extension packets according to importance of data positioned in the plurality of bands.

17. The operating method of claim 12, wherein the determining of the second packet type comprises:

dividing the plurality of packets; and determining, for each packet of the plurality of packets, the second packet type further based on a data amount of the audio signal.

18. A non-transitory computer-readable storage medium storing instructions that, when executed by a processor, cause the processor to perform an operating method of claim 12.

* * * * *